US012585001B2

(12) United States Patent　　　　(10) Patent No.: US 12,585,001 B2
Morimoto　　　　　　　　　　　　　(45) Date of Patent: Mar. 24, 2026

(54) OPTICAL DETECTION APPARATUS AND OPTICAL DETECTION SYSTEM

(71) Applicant: CANON KABUSHIKI KAISHA, Tokyo (JP)

(72) Inventor: Kazuhiro Morimoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 959 days.

(21) Appl. No.: 17/376,022

(22) Filed: Jul. 14, 2021

(65) Prior Publication Data

US 2022/0026542 A1　　Jan. 27, 2022

(30) Foreign Application Priority Data

Jul. 27, 2020　(JP) .................................. 2020-126315

(51) Int. Cl.
| *G01S 7/4863* | (2020.01) |
| *B60W 30/09* | (2012.01) |
| *G01S 17/08* | (2006.01) |
| *G01S 17/93* | (2020.01) |

(52) U.S. Cl.
CPC ........... *G01S 7/4863* (2013.01); *B60W 30/09* (2013.01); *G01S 17/08* (2013.01); *G01S 17/93* (2013.01)

(58) Field of Classification Search
CPC ........ G01S 7/4863; G01S 17/08; G01S 17/93; G01S 7/4865; G01S 17/931; B60W 30/09; H10F 39/182; H10F 39/184; H10F 39/199; H10F 39/809; H10F 39/811; H10F 39/8033
See application file for complete search history.

(56) References Cited

U.S. PATENT DOCUMENTS

| 2015/0041942 A1 | 2/2015 | Ebiko et al. |
| 2019/0115388 A1* | 4/2019 | Jung ................... H01L 27/1464 |
| 2019/0157323 A1 | 5/2019 | Ogi et al. |
| 2019/0252442 A1* | 8/2019 | Tanaka .............. H01L 27/14629 |
| 2020/0006410 A1* | 1/2020 | Wu ................... H01L 21/32051 |

FOREIGN PATENT DOCUMENTS

| JP | 2018088488 A | 6/2018 |
| JP | 2018201005 A | 12/2018 |
| JP | 2019114728 A | 7/2019 |
| WO | 2018174090 A1 | 9/2018 |
| WO | 2020092471 A1 | 5/2020 |

* cited by examiner

*Primary Examiner* — Su C Kim

(74) *Attorney, Agent, or Firm* — Canon U.S.A., Inc. IP Division

(57) ABSTRACT

An optical detection apparatus includes a trench isolation portion provided in a substrate and disposed between a plurality of photoelectric conversion elements. Each of the plurality of photoelectric conversion elements includes an avalanche diode. The avalanche diode includes a first semiconductor region of a first conductivity type, a second semiconductor region of a second conductivity type, and a third semiconductor region having an impurity concentration lower than impurity concentrations of the first and second semiconductor regions. The trench isolation portion includes a conductor and an insulator disposed between the conductor and the avalanche diode, and on a sidewall of the trench isolation portion, a second conductivity type layer is formed in which charges of the second conductivity type are accumulated, and the second conductivity type layer and the second semiconductor region are in contact with each other.

18 Claims, 25 Drawing Sheets

DRIFT
COMPONENT

DIFFUSION
COMPONENT

POTENTIAL

POTENTIAL

COMPARISON
EMBODIMENT

EXEMPLARY
EMBODIMENT

Y                    Y'

PROBABILITY
DISTRIBUTION (LOG)

DIFFUSION
TAIL

TIME (ns)

DRIFT COMPONENT
(GAUSSIAN DISTRIBUTION)

DIFFUSION COMPONENT
(EXPONENTIAL DISTRIBUTION)

P-CONCENTRATION: 80a > 80b

POTENTIAL

WHEN SECOND
CONDUCTIVITY TYPE
LAYER IS FORMED

WHEN SECOND
CONDUCTIVITY TYPE
LAYER IS NOT FORMED

Y        Y'

POTENTIAL

WHEN SECOND
CONDUCTIVITY TYPE
LAYER IS FORMED

WHEN SECOND
CONDUCTIVITY TYPE
LAYER IS NOT FORMED

FRONT VIEW

TOP VIEW

REAR VIEW

OPTICAL DETECTION APPARATUS AND OPTICAL DETECTION SYSTEM

BACKGROUND

Field

The present disclosure relates to an optical detection apparatus that performs photoelectric conversion, and an optical detection system.

Description of the Related Art

An optical detection apparatus is known that includes a pixel array formed such that a plurality of single-photon avalanche diode (SPAD) pixels are planarly arranged. In each of the SPAD pixels, in a P-N junction region in a semiconductor region, a photocharge resulting from a single photon causes avalanche multiplication.

Japanese Patent Application Laid-Open No. 2018-88488 discusses a configuration in which, in a semiconductor substrate including an avalanche diode, an inter-pixel isolation portion that isolates adjacent pixels is composed of a metal film and an insulating film. Japanese Patent Application Laid-Open No. 2018-88488 also discusses a configuration in which a P-type semiconductor region composed of a pinning layer continuously formed in contact with the insulating film to compose a part of an incident surface of the substrate and a hole accumulation layer formed inside the pinning layer is provided.

In an optical detection apparatus discussed in Japanese Patent Application Laid-Open No. 2018-88488, variation may occur in the time until photocharges generated in a semiconductor region reach a P-N junction region that causes avalanche multiplication. This is assumed to be due to the fact that a potential relative to a signal charge is unlikely to have a gradient in the P-type semiconductor region, and variation occurs in the time until a photocharge in the P-type semiconductor region comes out of the P-type semiconductor region. Consequently, variation occurs in the time until the detection of a photocharge is completed, and the temporal resolution of optical detection becomes low.

SUMMARY

According to an aspect of the present disclosure, an optical detection apparatus includes a pixel array unit in which a plurality of photoelectric conversion elements are disposed in a two-dimensional array in a planar view in a substrate, and a trench isolation portion provided in the substrate and disposed between the plurality of photoelectric conversion elements. Each of the plurality of photoelectric conversion elements includes an avalanche diode. The avalanche diode includes a first semiconductor region, a second semiconductor region, and a third semiconductor region. The first semiconductor region of a first conductivity type is disposed at a first depth level from a first surface of the substrate and charges of a same conductivity type as a signal charge are majority carriers in the first semiconductor region. The second semiconductor region of a second conductivity type is disposed at a second depth level where a distance from the first surface is longer than a first depth and a distance from a second surface opposed to the first surface is shorter than the distance from the first surface. The third semiconductor region is disposed at a third depth level deeper than the first depth level and shallower than the second depth level and has an impurity concentration lower than impurity concentrations of the first and second semiconductor regions. The trench isolation portion includes a conductor and an insulator disposed between the conductor and the avalanche diode. On a sidewall of the trench isolation portion, a second conductivity type layer is formed in which charges of the second conductivity type included in the third semiconductor region are accumulated, and the second conductivity type layer and the second semiconductor region are in contact with each other.

According to another aspect of the present disclosure, an optical detection apparatus includes a pixel array unit and a trench isolation portion. In the pixel array unit, a plurality of photoelectric conversion elements are disposed in a two-dimensional array in a planar view in a substrate. The trench isolation portion is provided in the substrate and disposed between the plurality of photoelectric conversion elements. Each of the plurality of photoelectric conversion elements includes an avalanche diode. The avalanche diode includes a first semiconductor region, a second semiconductor region, and a third semiconductor region. The first semiconductor region of a first conductivity type is disposed at a first depth level from a first surface of the substrate and charges of the same conductivity type as a signal charge are majority carriers in the first semiconductor region. The second semiconductor region of a second conductivity type is disposed at a second depth level where a distance from the first surface is longer than a first depth and a distance from a second surface opposed to the first surface is shorter than the distance from the first surface. The third semiconductor region of a first conductivity type is disposed at a third depth level deeper than the first depth level and shallower than the second depth level and has an impurity concentration lower than an impurity concentration of the first semiconductor region. The trench isolation portion includes a conductor and an insulator disposed between the conductor and the avalanche diode. The trench isolation portion and the third semiconductor region are in contact with each other.

According to yet another aspect of the present disclosure, an optical detection apparatus includes a pixel array unit and a trench isolation portion. In the pixel array unit, a plurality of photoelectric conversion elements are disposed in a two-dimensional array in a planar view in a substrate. The trench isolation portion is provided in the substrate and disposed between the plurality of photoelectric conversion elements. Each of the plurality of photoelectric conversion elements includes an avalanche diode. The avalanche diode includes a first semiconductor region and a second semiconductor region. The first semiconductor region of a first conductivity type is disposed at a first depth level from a first surface of the substrate and charges of the same conductivity type as a signal charge are majority carriers in the first semiconductor region. The second semiconductor region of a second conductivity type is disposed at a second depth level where a distance from the first surface is longer than a first depth and a distance from a second surface opposed to the first surface is shorter than the distance from the first surface. In the trench isolation portion, a dielectric layer composed of at least any one of a hafnium oxide layer, an aluminum oxide layer, a zirconium oxide layer, a titanium oxide layer, a tantalum oxide layer, and a ruthenium oxide layer is disposed.

According to yet another aspect of the present disclosure, an optical detection apparatus includes a pixel array unit and a trench isolation portion. In the pixel array unit, a plurality of photoelectric conversion elements are disposed in a two-dimensional array in a planar view in a substrate. The trench isolation portion is provided in the substrate and disposed between the plurality of photoelectric conversion elements. Each of the plurality of photoelectric conversion elements includes an avalanche diode. The avalanche diode includes a first semiconductor region and a second semiconductor region. The first semiconductor region of a first conductivity type is disposed at a first depth level from a first surface of the substrate and charges of the same conductivity type as a signal charge are majority carriers in the first semiconductor region. The second semiconductor region of a second conductivity type is disposed at a second depth level where a distance from the first surface is longer than a first depth and a distance from a second surface opposed to the first surface is shorter than the distance from the first surface. In the trench isolation portion, a dielectric having a negative fixed charge is disposed.

According to yet another aspect of the present disclosure, an optical detection apparatus includes a pixel array unit and a trench isolation portion. In the pixel array unit, a plurality of photoelectric conversion elements are disposed in a two-dimensional array in a planar view in a substrate. The trench isolation portion is provided in the substrate and disposed between the plurality of photoelectric conversion elements. Each of the plurality of photoelectric conversion elements includes an avalanche diode. In the trench isolation portion, a first dielectric layer composed of at least any one of a hafnium oxide layer, an aluminum oxide layer, a zirconium oxide layer, a titanium oxide layer, a tantalum oxide layer, and a ruthenium oxide layer is disposed. The substrate includes a first surface and a second surface opposed to the first surface. On the second surface, a second dielectric layer composed of at least any one of a hafnium oxide layer, an aluminum oxide layer, a zirconium oxide layer, a titanium oxide layer, a tantalum oxide layer, and a ruthenium oxide layer is disposed.

According to yet another aspect of the present disclosure, an optical detection apparatus includes a pixel array unit and a trench isolation portion. In the pixel array unit, a plurality of photoelectric conversion elements are disposed in a two-dimensional array in a planar view in a substrate. The trench isolation portion is provided in the substrate and disposed between the plurality of photoelectric conversion elements. Each of the plurality of photoelectric conversion elements includes an avalanche diode. In the trench isolation portion, a first dielectric having a negative fixed charge is disposed. The substrate includes a first surface and a second surface opposed to the first surface, and wherein on the second surface, a second dielectric having a negative fixed charge is disposed.

Further features of the present disclosure will become apparent from the following description of exemplary embodiments with reference to the attached drawings.

BRIEF DESCRIPTION OF THE DRAWINGS

FIG. 20 is a block diagram of an optical detection system according to an eighth exemplary embodiment.

DESCRIPTION OF THE EMBODIMENTS

Figure 1:
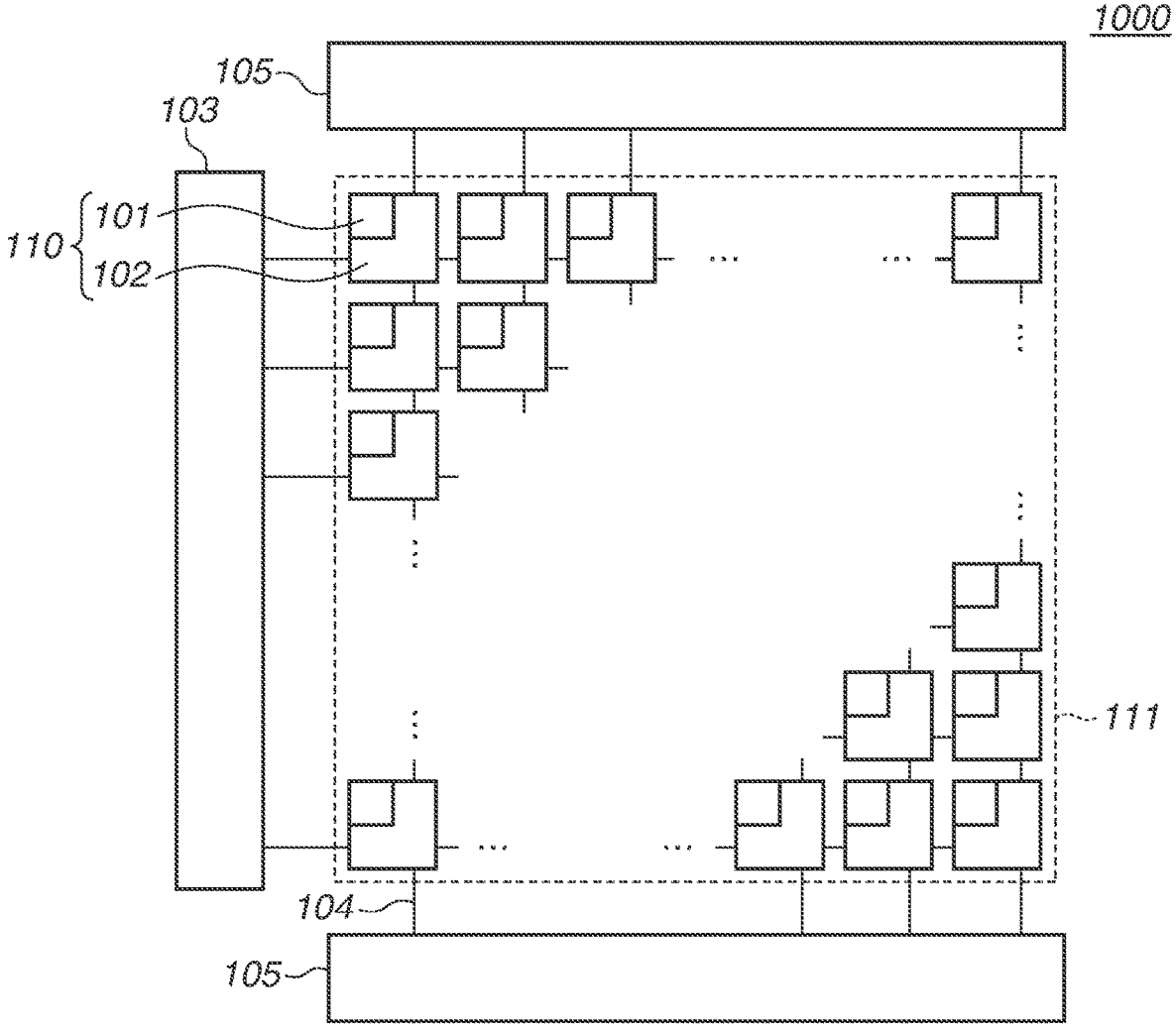
FIG. 1 is a block diagram of an optical detection apparatus.

Exemplary embodiments illustrated below merely make the technical idea of the present disclosure specific, and do not limit the present disclosure. The sizes of and the positional relationships between members illustrated in the drawings are occasionally exaggerated to clarify the description. In the following description, similar components are occasionally designated by the same numbers and not described.

Figure 2:
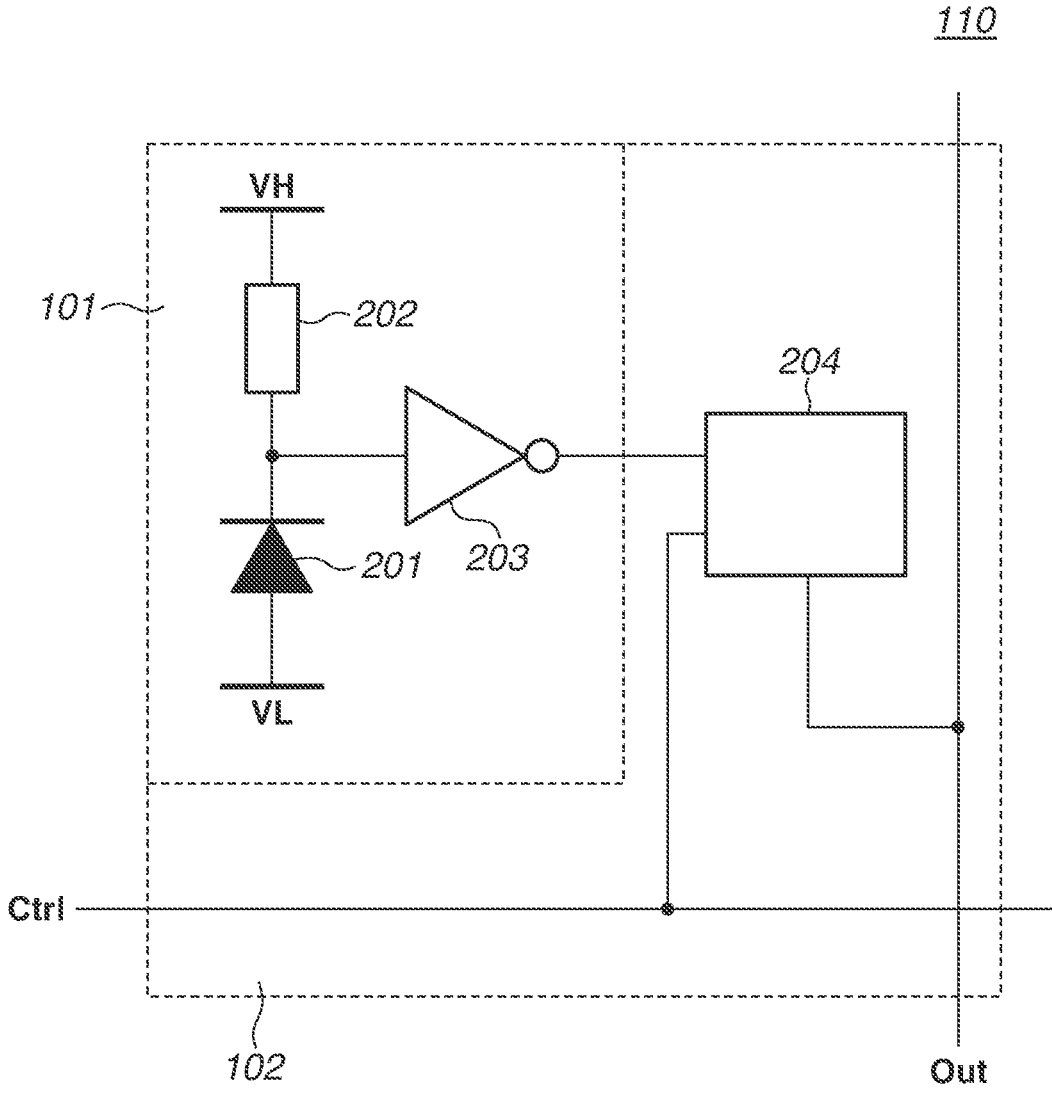
FIG. 2 is a block of a pixel.

With reference to FIGS. 1 and 2, components common to optical detection apparatuses according to exemplary embodiments are described. Each optical detection apparatus includes single-photon avalanche diode (SPAD) pixels including avalanche diodes. The conductivity type of a charge used as a signal charge between a pair of charges generated in each avalanche diode is referred to as a "first conductivity type". The conductivity type opposite to the first conductivity type is referred to as a "second conductivity type". A description is given below of an example where the signal charge is an electron, the first conductivity type is an N-type, and the second conductivity type is a P-type. Alternatively, the signal charge may be a hole, the first conductivity type may be a P-type, and the second conductivity type may be an N-type.

FIG. 1 is a block diagram illustrating an optical detection apparatus 1000. The optical detection apparatus 1000 includes a pixel array unit 111, a horizontal scanning circuit unit 105, a signal line 104, and a vertical scanning circuit unit 103.

In the pixel array unit 111, a plurality of avalanche diodes included in SPAD pixels (hereinafter referred to as "pixels") 110 is disposed in a two-dimensional array in a planar view). Each pixel 110 includes a photoelectric conversion unit 101 and a pixel signal processing unit 102. The pixel 110 only needs to include at least the photoelectric conversion unit 101. Specifically, the pixel 110 is one of components that include photoelectric conversion units 101 and are repeatedly disposed. The photoelectric conversion unit 101 converts light into an electric signal. The pixel signal processing unit 102 outputs the converted electric signal to the signal line 104.

The vertical scanning circuit unit 103 and the horizontal scanning circuit unit 105 supply a control pulse to each pixel 110. As the vertical scanning circuit unit 103, a logic circuit such as a shift register or an address decoder is used.

The signal line 104 supplies a digital signal output from one of the pixels 110 selected by the vertical scanning circuit unit 103 as a potential signal to a circuit subsequent to the pixel 110.

In FIG. 1, the pixels 110 in the pixel array unit 111 may be disposed in one-dimensional arrangement. Alternatively, the pixel array unit 111 may be divided into blocks of a plurality of pixel columns, and the vertical scanning circuit unit 103 and the horizontal scanning circuit unit 105 may be placed in each block. Yet alternatively, the vertical scanning circuit unit 103 and the horizontal scanning circuit unit 105 may be disposed in each pixel column.

The function of the pixel signal processing unit 102 does not necessarily need to be provided in each of all the pixels 110. For example, a single pixel signal processing unit 102 may be shared by a plurality of pixels 110, and signal processing may be sequentially performed. To increase the aperture ratio of the photoelectric conversion unit 101, at least a part of the pixel signal processing unit 102 may be provided in a semiconductor substrate (a second substrate) different from that of the photoelectric conversion unit 101. In this case, the photoelectric conversion unit 101 and the pixel signal processing unit 102 are electrically connected together via connection wiring provided in each pixel. It is desirable to dispose the avalanche diode of the photoelectric conversion unit 101 in a first substrate and dispose other components in the second substrate. In the following exemplary embodiments, an example is described where the avalanche diode is provided in the first substrate, a circuit such as a waveform shaping unit is provided in the second substrate, and the first and second substrates are laminated together. The vertical scanning circuit unit 103, the horizontal scanning circuit unit 105, and the signal line 104 may be provided in the second substrate.

FIG. 2 is a block diagram illustrating a pixel 110 including an equivalent circuit according to the present exemplary embodiment. In FIG. 2, a single pixel 110 includes a photoelectric conversion unit 101 and a pixel signal processing unit 102.

The photoelectric conversion unit 101 includes one or more avalanche diodes 201 in an array, a quench element 202, and a waveform shaping unit 203.

The avalanche diodes 201 generate a pair of charges according to incident light by photoelectric conversion. The avalanche diodes 201 are photoelectric conversion elements. To the cathode of the avalanche diode 201, a potential based on a potential VH higher than a potential VL supplied to the anode of the avalanche diode 201 is supplied. Then, to the anode and the cathode of the avalanche diode 201, potentials are supplied so that a reverse bias that avalanche-multiplies a photon incident on the avalanche diode 201 is applied to the anode and the cathode of the avalanche diode 201. Photoelectric conversion is performed in the state where such potentials that cause a reverse bias are supplied, whereby charges generated by incident light cause avalanche multiplication, and an avalanche current is generated.

In a case where potentials that cause a reverse bias are supplied, and if the potential difference between the anode and the cathode is greater than a breakdown voltage, the avalanche diode 201 switches to a Geiger mode operation. An avalanche diode that detects a faint signal at a single-photon level at high speed using the Geiger mode operation is a SPAD.

The quench element 202 is connected to a power supply that supplies the high potential VH, and the avalanche diode 201. The quench element 202 is composed of a P-type metal-oxide-semiconductor (MOS) transistor or a resistor element such as a poly resistor. Alternatively, the quench element 202 may be composed of a plurality of MOS transistors in series. If a photocurrent is multiplied by avalanche multiplication in the avalanche diode 201, a current obtained by a multiplied charge flows through a connection node between the avalanche diode 201 and the quench element 202. Due to a voltage drop caused by this current, the potential of the cathode of the avalanche diode 201 decreases, and the avalanche diode 201 stop forming an electron avalanche. Consequently, the avalanche multiplication of the avalanche diode 201 stops. Then, the potential VH of the power supply is supplied to the cathode of the avalanche diode 201 via the quench element 202. Thus, the potential supplied to the cathode of the avalanche diode 201 returns to the potential VH. That is, the operating region of the avalanche diode 201 switches to the Geiger mode operation again. As described above, the quench element 202 has the function of serving as a load circuit (e.g., a quench circuit) when a charge is multiplied by avalanche multiplication, thereby preventing the avalanche multiplication (e.g., a quench operation). The quench element 202 also has the function of, after preventing the avalanche multiplication, switching the operating region of the avalanche diode 201 to the Geiger mode again.

The waveform shaping unit 203 is connected to the connection node between the node of the avalanche diodes 201 and the node of the quench element 202. The waveform shaping unit 203 shapes a change in the potential of the cathode of the avalanche diode 201 obtained when a photon is detected, and outputs a rectangular pulse signal. As the waveform shaping unit 203, for example, an inverter circuit is used. Although an example is illustrated where a single inverter is used as the waveform shaping unit 203, a circuit where a plurality of inverters is connected together in series may be used. Not only an inverter but also another circuit having a waveform shaping effect may be used.

The pixel signal processing unit 102 includes a processing circuit 204.

The processing circuit 204 is connected to the waveform shaping unit 203. The pulse signal output from the waveform shaping unit 203 is subjected to signal processing by the processing circuit 204. In a case where the processing circuit 204 is, for example, an N-bit counter (N is a positive integer), the processing circuit 204 can count up to as many single-photon pulse signals as about 2 to the power of N. The counted signals are held as detected signals. When a reset control pulse is supplied to the processing circuit 204 via a control line, the signals held in the processing circuit 204 are reset.

The output of the processing circuit 204 is connected to the signal line 104. A selection circuit may be provided in the processing circuit 204 so that a pixel signal can be read at a desired timing, or the processing circuit 204 may be directly connected to the signal line 104 and always output a signal. To the processing circuit 204, a control pulse Ctrl is supplied from the vertical scanning circuit unit 103 in FIG. 1 via a control line, thereby giving a clock for performing signal processing on the output of the processing circuit 204 to the processing circuit 204, or thereby switching whether to output the output of the processing circuit 204 to the signal line 104.

A switch such as a transistor may be disposed between the quench element 202 and the avalanche diodes 201, and a mode where the avalanche diodes 201 can perform avalanche multiplication and a mode where the avalanche diodes 201 cannot perform avalanche multiplication may be switched. Similarly, the supply of a potential such as the high potential VH or the low potential VL to the avalanche diodes 201 may be electrically switched using a switch such as a transistor. Alternatively, a switch such as a transistor may be disposed between the photoelectric conversion unit 101 and the pixel signal processing unit 102, and the input of a signal from the photoelectric conversion unit 101 to the processing circuit 204 may be controlled.

In the pixel array unit 111 in which the plurality of pixels 110 is disposed in a matrix, signals may be acquired by a rolling shutter operation for sequentially resetting the outputs of the processing circuits 204 with respect to each row and sequentially outputting output signals of the processing circuit 204 with respect to each row.

Alternatively, signals may be acquired by a global electronic shutter operation for simultaneously resetting the counts of the processing circuits 204 in all the pixel rows and sequentially outputting signals held in the processing circuits 204 with respect to each row. In a case where the global electronic shutter operation is performed, it is desirable to provide a unit for switching a case where the counting of the processing circuits 204 is performed and a case where the counting of the processing circuits 204 is not performed. This switching unit is the above switch, for example.

A configuration may be employed in which the processing circuit 204 in FIG. 2 acquires a pulse detection timing. In this case, in the processing circuit 204, a time-to-digital conversion circuit (a time to digital converter: hereinafter, a "TDC") and a memory are used instead of the counter circuit.

At this time, the generation timing of a pulse signal output from the waveform shaping unit 203 is converted into a digital signal by the TDC. To measure the timing of the pulse signal, a control pulse Ref (e.g., a reference signal) is supplied to the TDC from the vertical scanning circuit unit 103 in FIG. 1 via a driving line. Using a control pulse Ref as a reference, the TDC acquires as a digital signal a signal when the input timing of a signal output from each pixel via the waveform shaping unit 203 is a relative time.

The optical detection apparatuses of the exemplary embodiments are described below.

Figure 3:
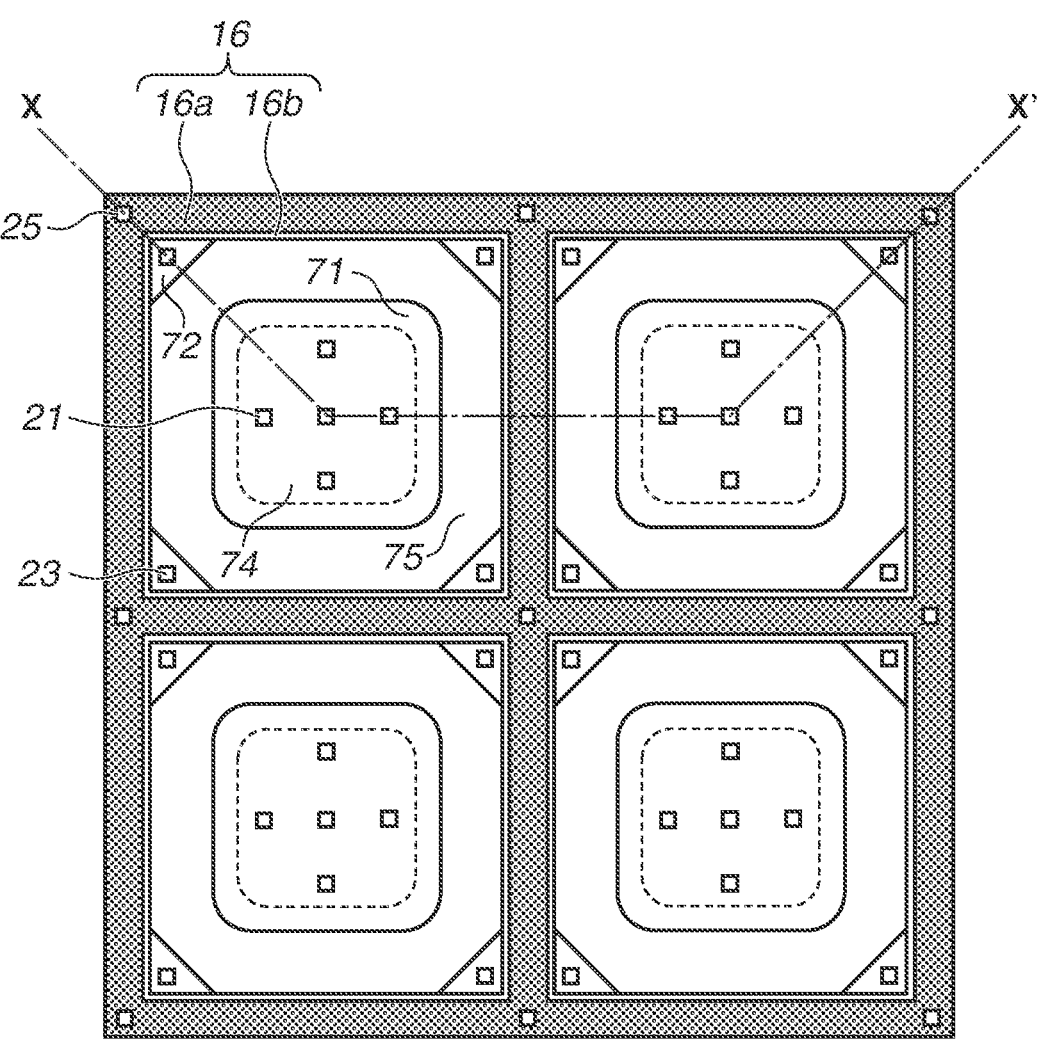
FIG. 3 is a schematic plan view of single-photon avalanche diode (SPAD) pixels according to a first exemplary embodiment.
Figure 4:
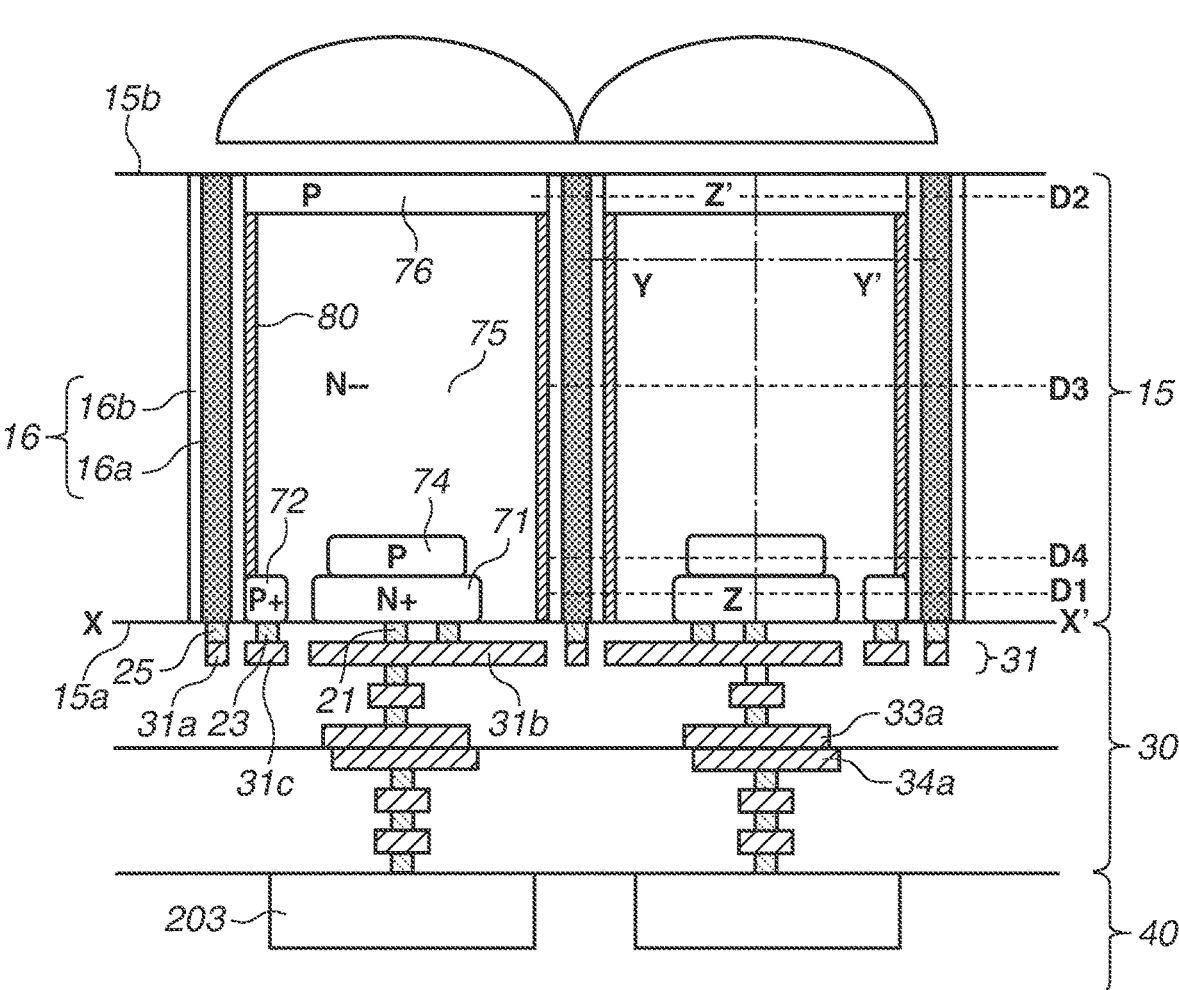
FIG. 4 is a schematic cross-sectional view of the SPAD pixels according to the first exemplary embodiment.

FIG. 3 is a schematic plan view of SPAD pixels according to a first exemplary embodiment. FIG. 4 is a schematic cross-sectional view along X-X' of the SPAD pixels according to the first exemplary embodiment. An avalanche diode according to the present exemplary embodiment is disposed in a semiconductor substrate 15 (the first substrate).

The semiconductor substrate 15 includes a first surface 15a and a second surface 15b opposed to the first surface 15a. For example, the first surface 15a is a surface of the semiconductor substrate 15 on the side where a wiring layer is formed. In the present exemplary embodiment, light is incident from the second surface 15b. FIG. 3 is a planar view of the first surface 15a of the semiconductor substrate 15 and also illustrates contact plugs connected to semiconductor regions. In the specification, a "planar view" refers to a view from a direction perpendicular to a surface parallel to the first surface 15a of the substrate 15. A "cross section" refers to a surface in a direction perpendicular to the plane. In the specification, a "depth level" of a line or surface D refers to a distance from the first surface 15a to the line or surface D where D is between the first surface 15a and the second surface 15b.

The thickness of the semiconductor substrate 15 can be appropriately set depending on the wavelength at which optical detection is performed. The color of light to be detected by the optical detection apparatus can be set to blue, green, or infrared light according to the purpose. The peak wavelength of light to be detected by the optical detection apparatus can be set in the range from 350 nm or more to 1000 nm or less, for example.

FIG. 3 illustrates four photoelectric conversion elements and trench isolation portions 16 at least a part of which is between the photoelectric conversion elements, which are parts of four SPAD pixels. In the specification, a region partitioned by each trench isolation portion 16 corresponds to a photoelectric conversion element of a SPAD pixel. A single photoelectric conversion element is composed of an avalanche diode including at least one avalanche multiplication region. In another aspect, a "photoelectric conversion element" refers to one of components repeatedly disposed in the pixel array unit 111.

FIG. 3 illustrates, as components included in the avalanche diode according to the present exemplary embodiment, a semiconductor region 71 of the first conductivity type (e.g., a first semiconductor region), a semiconductor region 72 of the second conductivity type, and a semiconductor region 75 (e.g., a third semiconductor region) disposed between the semiconductor regions 71 and 72. FIG. 3 also illustrates contact plugs connected to the semiconductor regions. Although invisible from the first surface 15a, for ease of description, FIG. 3 illustrates a region where a semiconductor region 74 of the second conductivity type (e.g., a fourth semiconductor region) is disposed.

The semiconductor region 71 forms the cathode of the avalanche diode. To the semiconductor region 71, a plurality of contact plugs 21 is connected. The contact plugs 21 supply a potential to the cathode of the avalanche diode via a wiring layer. The plurality of contact plugs 21 is provided in the center of and around a region surrounded by a trench isolation portion 16 in a planar view. The contact plugs 21 around the region are provided at positions that do not overlap lines connecting contact plugs 23 disposed at opposing corners. The plurality of contact plugs 21 is connected to the semiconductor region 71, whereby it is possible to prevent a decrease in the reading speed of a signal contributing to the position where avalanche multiplication occurs in the semiconductor region 71. Further, the contact plugs 21 are disposed at positions away from the contact plugs 23, whereby it is easy to lay out wires connected to the anode and the cathode to which high voltages are applied, at a great distance from each other. This improves the reliability of elements.

The semiconductor region 72 forms the anode of the avalanche diode. To the semiconductor region 72, the contact plugs 23 are connected. The semiconductor region 72 is disposed at the corners of the photoelectric conversion element.

Between the photoelectric conversion elements, trench isolation portions 16 are formed. The trench isolation portions 16 are disposed around the photoelectric conversion elements in a planar view. In FIG. 3, the shape of each photoelectric conversion element is a square. The present disclosure, however, is not limited to this. A trench isolation portion 16 according to the present exemplary embodiment includes a conductor 16a and an insulator 16b.

The conductor 16a is composed of, for example, metal that reflects or absorbs light. As the metal that reflects light, tungsten, aluminum, or copper can be used. "Reflects light" refers to reflecting 30% or more of light of a predetermined wavelength, for example. The predetermined wavelength is the wavelength of light that the optical detection apparatus mainly detects.

As the insulator 16b, for example, silicon oxide can be used. The insulator 16b is disposed between the conductor 16a and the avalanche diode. That is, the insulator 16b is disposed between the conductor 16a and the semiconductor regions of the semiconductor substrate 15.

FIG. 4 illustrates an X-X' cross-sectional view of FIG. 3. In FIG. 4, the photoelectric conversion element includes the semiconductor region 71 of the first conductivity type, the semiconductor region 72 of the second conductivity type, the semiconductor region 74 of the second conductivity type, the semiconductor region 75, and a semiconductor region 76 of the second conductivity type (a second semiconductor region). An intense electric field is applied to a P-N junction region between the semiconductor regions 71 and 74, and an avalanche multiplication region is formed by the semiconductor regions 71 and 74. Each semiconductor region is a region to which impurities are added by ion implantation, or a region to which impurities are added when the semiconductor substrate 15 is prepared and epitaxially grown.

At a first depth level D1 where the distance from the first surface 15a of the substrate 15 to D1 is a first distance, the semiconductor regions 71 and 72 are disposed. As described above, at least a part of the semiconductor region 75 is disposed between the semiconductor regions 71 and 72. In the specification, an m-th semiconductor region being disposed at an n-th depth means, for example, that a region (e.g., a peak) where the impurity concentration of implanted impurities is highest is disposed at the n-th depth. The peak does not necessarily need to be disposed at the n-th depth, and a designing error and a manufacturing error are also accepted.

The semiconductor region 75 is a semiconductor region of the first conductivity type having an impurity concentration lower than that of the semiconductor region 71. At least a part of the semiconductor region 75 is disposed between the semiconductor regions 71 and 72, whereby it is possible to facilitate the movement of a charge near the semiconductor region 75 to positions close to the contact plugs 21.

The impurity concentration of the semiconductor region 75 is made lower than the impurity concentration of the semiconductor region 71. For example, if the impurity concentration of the semiconductor region 71 is $6.0 \times 10^{18}$ atms/cm$^3$ or more, the impurity concentration of the semiconductor region 75 is $1.0 \times 10^{18}$ atms/cm$^3$ or less. At this time, the impurity concentration of the semiconductor region 72 is $6.0 \times 10^{18}$ atms/cm$^3$ or more. The impurity concentration of the semiconductor region 74 is $1.0 \times 10^{18}$ atms/cm$^3$ or less.

At a fourth depth level D4 deeper than the first depth level D1, the semiconductor region 74 is formed. The semiconductor region 74 is a semiconductor region of the second conductivity type having an impurity concentration lower than that of the semiconductor region 72. As described above, the semiconductor region 74 forms an avalanche multiplication region with the semiconductor region 71.

At a third depth level D3 deeper than the first depth level D1, at least a part of the semiconductor region 75 is disposed. In FIG. 4, the semiconductor region 75 is a semiconductor region of the first conductivity type having an impurity concentration lower than that of the semiconductor region 71.

At a second depth level D2 where the depth from the first surface 15a is greater than the first depth D1, the semiconductor region 76 of the second conductivity type is disposed. At the second depth level D2, the distance from the first surface 15a (e.g., a second distance) is longer than the first distance, and the distance from the second surface 15b (a third distance) is shorter than the second distance. The second depth D2 is greater than the fourth depth D4 and the third depth D3. In FIG. 4, the second depth D2 is located near the second surface 15b. The semiconductor regions 76 and 72 become conductive with each other via a second conductivity type layer 80. Consequently, it is possible to create a potential that facilitates the movement of a signal charge present in the semiconductor region 75 to the avalanche multiplication region formed by the semiconductor regions 71 and 74. Thus, it is possible to move also a signal charge generated near the second conductivity type layer 80 to the avalanche multiplication region. This can prevent a decrease in the aperture ratio.

Between the pixels, a trench isolation portions 16 is disposed. The trench isolation portion 16 according to the present exemplary embodiment is formed to penetrate from the second surface 15b to the first surface 15a of the semiconductor substrate 15. As described above, the trench isolation portion 16 includes the conductor 16a and the insulator 16b.

The conductor 16a is connected to a wiring pattern 31a included in a first wiring layer 31 via a contact plug 25. To the contact plug 25, a predetermined potential Vt1 is supplied via the wiring pattern 31a. The predetermined potential Vt1 is a potential at which a second conductivity type layer 80 is formed in which charges of the second conductivity type are accumulated near a region where the semiconductor of the substrate 15 and the insulator 16b are in contact with each other. In FIG. 4, since the semiconductor region 75 is a semiconductor region of the first conductivity type, the second conductivity type layer 80 is an inversion layer. In a case where the first conductivity type is an N-type, the potential Vt1 supplied to the contact plug 25 is a potential lower than 0 V. In a case where the first conductivity type is a P-type, the potential Vt1 is a potential higher than 0 V.

To the semiconductor region 71, the contact plugs 21 are connected. To the contact plugs 21, a predetermined potential Vt2 is supplied via a wiring pattern 31b. To the semiconductor region 72, the contact plugs 23 are connected. To the contact plugs 23, a predetermined potential Vt3 is supplied via a wiring pattern 31c. As the potentials Vt2 and Vt3, potentials that supply reverse bias voltages to the semiconductor region 71 and the semiconductor regions 72 and 74 are supplied.

It is desirable that the wiring pattern 31*b* to which the contact plugs 21 are connected should have a width greater than the width of the semiconductor region 71. In another aspect, it is desirable that the wiring pattern 31*b* should be disposed to cover the semiconductor region 71 in a planar view. It is more desirable that the wiring pattern 31*b* should cover the entirety of the semiconductor region 71. Consequently, it is possible to efficiently return light passing through the semiconductor substrate 15 and traveling toward a wiring layer 30 to the semiconductor substrate 15.

In a case where the first conductivity type is an N-type, the relationships between the potentials Vt1, Vt2, and Vt3 are the potential Vt1≤the potential Vt3<the potential Vt2. In a case where the first conductivity type is a P-type, the relationships between the potentials Vt1, Vt2, and Vt3 are obtained by reversing the inequality signs. The potentials Vt1, Vt2, and Vt3 are set with respect to a common reference potential (e.g., 0 V). The potential Vt1 is a potential at which the second conductivity type layer 80 is formed on a sidewall of the trench isolation portion 16 and avalanche multiplication does not occur between the second conductivity type layer 80 and the semiconductor region 75. The potential Vt1 can be set in the range from −50 V or more to −5 V or less, for example.

The predetermined potential Vt1 does not need to be always supplied to the contact plug 25. The predetermined potential Vt1 only needs to be supplied during at least a part of the period when the photoelectric conversion element receives light. It is desirable that the predetermined potential Vt1 should be supplied during the entire period when the photoelectric conversion element receives light.

In the present exemplary embodiment, during the period when the predetermined potential Vt1 is not supplied to the contact plug 25, the second conductivity type layer 80 is not formed on the sidewall of the trench isolation portion 16. That is, during the period when the predetermined potential Vt1 is not supplied to the contact plug 25, the trench isolation portion 16 and the semiconductor region 75 of the first conductivity type are in contact with each other. Then, if the predetermined potential Vt1 is supplied to the contact plug 25, the second conductivity type layer 80 is formed between the insulator 16*b* and the semiconductor region 75. The second conductivity type layer 80 is formed on the sidewall of the trench isolation portion 16 in a region that is in contact with a semiconductor region of the first conductivity type (a region that is not in contact with a semiconductor region of the second conductivity type).

The second conductivity type layer 80 is formed, whereby the semiconductor regions 72 and 76 are connected together by the second conductivity type layer 80. Thus, to the semiconductor region 76, a potential supplied from the contact plugs 23 via the second conductivity type layer 80 is supplied.

Figure 5A:
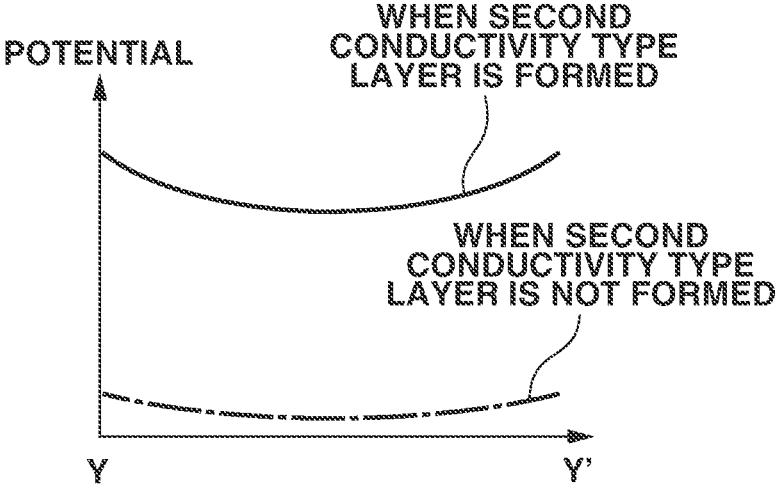
FIGS. 5A and 5B are potential diagrams of the SPAD pixels according to the first exemplary embodiment.
Figure 5B:
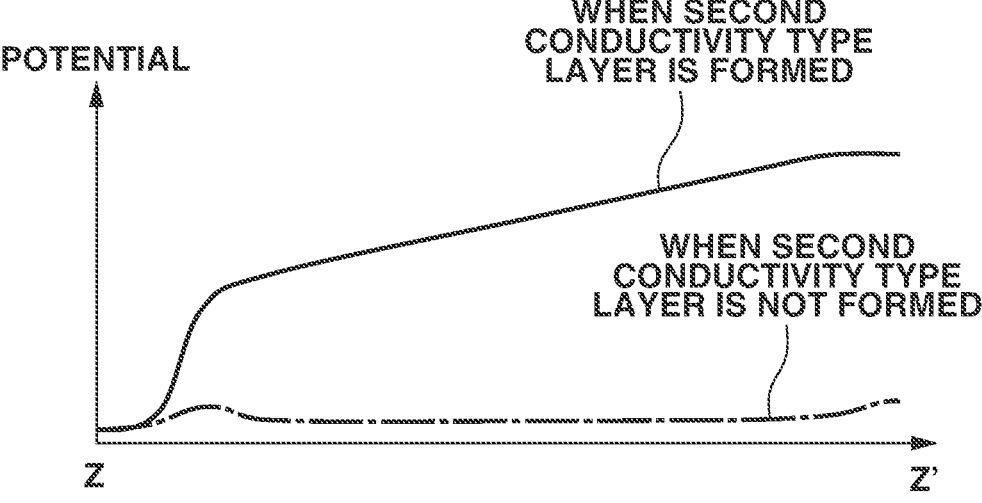

FIGS. 5A and 5B illustrate potential diagrams of a potential relative to a charge of the first conductivity type when the second conductivity type layer 80 is formed and when the second conductivity type layer 80 is not formed. The time when the second conductivity type layer 80 is formed is the time when the potential Vt1 is supplied to the contact plug 25. The time when the second conductivity type layer 80 is not formed is the time the potential Vt1 is not supplied to the contact plug 25. FIG. 5A is a potential diagram along Y-Y' in FIG. 4. FIG. 5B is a potential diagram along Z-Z' in FIG. 4. A potential when the second conductivity type layer 80 is formed is indicated by a solid line. A potential when the second conductivity type layer 80 is not formed is indicated by a one-dot chain line. As described above, the second conductivity type layer 80 is formed, whereby the potential Vt2 supplied from the contact plugs 23 is supplied to the semiconductor region 76. Thus, as illustrated in FIG. 5A, the potential of the second conductivity type layer 80 can be made high, and the potential of the semiconductor region 75 can be made low. Further, as illustrated in FIG. 5B, a potential can be made lower from the second surface 15*b* toward the first surface 15*a*. That is, a potential can be made lower toward the avalanche multiplication region. This facilitates the movement of a signal charge to the avalanche multiplication region. Thus, it is possible to improve the temporal resolution of optical detection.

Figures 6A, 6B, 6C:
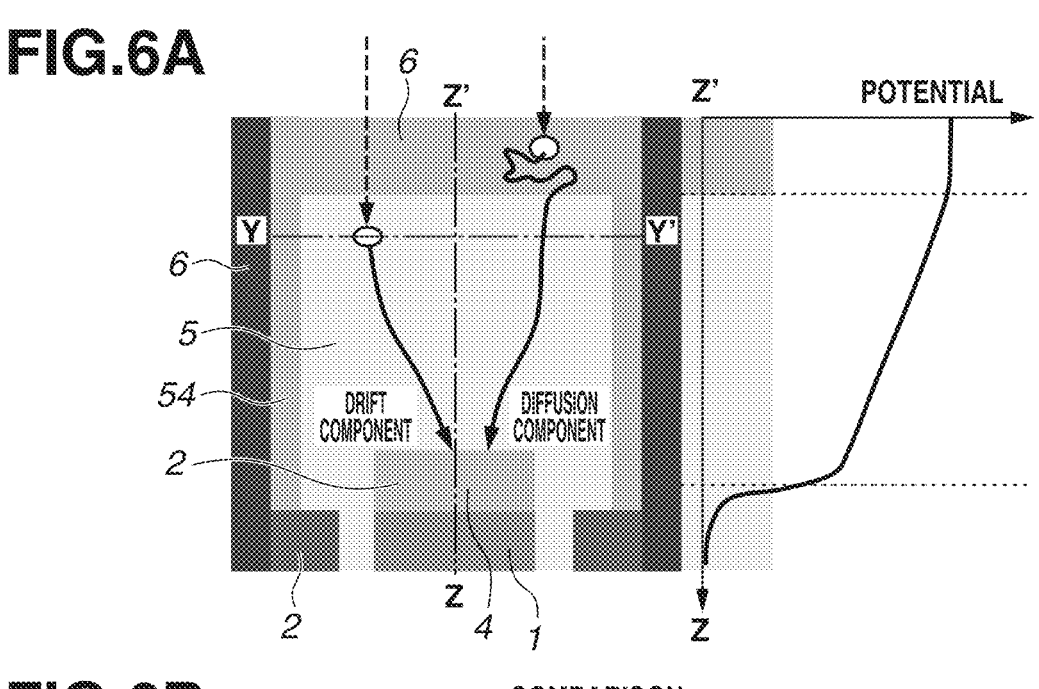
FIGS. 6A to 6C are diagrams illustrating a comparison embodiment.

The effect of supplying the potential of the contact plugs 23 to the semiconductor region 76 via the second conductivity type layer 80 is described by comparing the present exemplary embodiment with a comparison embodiment illustrated in FIGS. 6A to 6C. As illustrated in FIG. 6A, in the comparison embodiment, a semiconductor region 54 of the second conductivity type is formed on the sidewall of the trench isolation portion 16. The semiconductor region 54 is formed by implanting impurities through the first surface 15*a* or the second surface 15*b* of the semiconductor substrate 15 using a photo mask.

FIG. 6B illustrates a potential relative to a charge of the first conductivity type along Y-Y' in FIG. 6A. As illustrated in FIG. 6B, in a region where the semiconductor region 54 of the second conductivity type is disposed, a potential relative to a signal charge is flatter than in the present exemplary embodiment. As illustrated in FIG. 6A, a charge avalanche-multiplied and read as a signal divides into a drift component and a diffusion component. The drift component is a signal charge that does not remain in the semiconductor region 54 or a semiconductor region 6 and travels toward an avalanche multiplication region. The diffusion component is a signal charge that remains in the semiconductor region 54 or the semiconductor region 6 for a certain time and then travels toward the avalanche multiplication region later than the drift component. As illustrated in FIG. 6C, generally, if the signal charges are likely to be drift components but include diffusion components, signal charges reach the avalanche multiplication region late and form a diffusion tail. Consequently, the temporal resolution (timing jitter) deteriorates.

In response, in the present exemplary embodiment, the second conductivity type layer 80 is formed on the sidewall of the trench isolation portion 16, and a potential is supplied to the semiconductor region 76 via the second conductivity type layer 80. This can eliminate a flat portion of a potential along Y-Y'. The concentration of a portion where the impurity concentration of the second conductivity type is lowest on the sidewall of the trench isolation portion 16 is $5 \times 10^{17}$ cm$^{-3}$ or less.

In the comparison embodiment, the semiconductor region 54 is formed by implantation. Generally, if impurities are implanted at the same impurity concentration, the spread of the impurities is larger in impurity implantation to a deep portion than in impurity implantation to a shallow portion. That is, the width of a semiconductor region of the second conductivity type is more likely to be great in the deep portion than in the shallow portion. Thus, the deeper the portion is, the more likely the width of the semiconductor region 54 is great, and the more likely a region where a potential is flat is formed.

Meanwhile, according to the present exemplary embodiment, since the second conductivity type layer 80 is formed by supplying the potential Vt1, a region where charges of the second conductivity type are majority carriers can be made narrower than in a case where the semiconductor region 54 is formed. Thus, it is possible to reduce a diffusion component.

A region where the width of the semiconductor region 54 is great is formed as described above without depending on the peak wavelength of light to be photoelectrically converted. This is remarkable in the case of infrared light. In an optical detection apparatus that photoelectrically converts infrared light, the semiconductor substrate 15 needs to be made thick. For example, the thickness of the semiconductor substrate 15 is occasionally set to 3.5 μm or more and 15 μm or less. Thus, the distance from a surface of the semiconductor substrate 15 through which impurities are implanted to a deep portion of the semiconductor substrate 15 is more likely to be long than in the case of visible light, and the width of the semiconductor region 54 is more likely to be great than in the case of visible light. Thus, in the optical detection apparatus that photoelectrically converts infrared light, an improvement in the temporal resolution according to the present exemplary embodiment is remarkable. Also in a case where light to be photoelectrically converted is visible light, a region where the width of the semiconductor region 54 is great is formed. Thus, it is possible to obtain the effect of improving the temporal resolution.

It is desirable that the aperture ratio of the photoelectric conversion element should be 50% or more and 100% or less, for example. Consequently, it is possible to efficiently read a photoelectrically converted charge. Generally, the aperture ratio is determined based on the area ratio between the photoelectric conversion element and an avalanche multiplication region. The "avalanche multiplication region" refers to an intense electric field region of a P-N junction. In the case of a structure where a charge can be collected in a horizontal direction as in a second exemplary embodiment, the aperture ratio is determined based on the area ratio between the photoelectric conversion element and a photoelectric conversion region.

It is desirable that the width of the second conductivity type layer 80 should be the same from the first surface 15a to the second surface 15b. The width of the second conductivity type layer 80 is 1 nm or more and 100 nm or less, for example. The width of the second conductivity type layer 80 varies depending on the potential Vt1 to be supplied, and therefore is not limited to this.

A signal read from the photoelectric conversion element is output to a waveform shaping unit 203 disposed in a semiconductor substrate 40.

The semiconductor substrates 15 and 40 are electrically and mechanically joined together via wiring patterns 33a and 34a of the wiring layer 30. The wiring patterns 33a and 34a are composed of copper (Cu), for example.

It is desirable that the conductor 16a should be formed from the same depth as the first surface 15a to the same depth as the second surface 15b. The present disclosure, however, is not limited to this. The conductor 16a may be formed from the first surface 15a to a depth in the middle of the semiconductor substrate 15, and the conductor 16a may not be formed from the depth in the middle to the depth of the second surface 15b. For example, the conductor 16a may not be formed at the same depth as the semiconductor region 76.

A description has been given above of a case where the semiconductor region 75 is a semiconductor region of the first conductivity type. Alternatively, the semiconductor region 75 may be a semiconductor region of the second conductivity type. In a case where the semiconductor region 75 is a semiconductor region of the second conductivity type, the second conductivity type layer 80 is an accumulation layer. The potential Vt2 supplied to the contact plugs 21 is a potential lower than 0 V. In a case where the first conductivity type is an N-type, the relationships between the potentials Vt1, Vt2, and Vt3 are the potential Vt1≤the potential Vt3<the potential Vt2. In a case where the second conductivity type layer 80 is an accumulation layer, it is desirable that the potential Vt2 should be −50 V or more and −5 V or less.

In the present exemplary embodiment, an avalanche multiplication region is formed by the semiconductor regions 71 and 74. The present disclosure, however, is not limited to this. For example, also in a case where the semiconductor region 74 is not disposed and an avalanche multiplication region is formed by the semiconductor region 76 and the semiconductor regions 75 and 71, it is possible to obtain the effect of the present disclosure.

As described above, based on the optical detection apparatus according to the first exemplary embodiment, it is possible to prevent a decrease in the temporal resolution of signal reading as compared with the optical detection apparatus according to the comparison embodiment.

Figure 7:
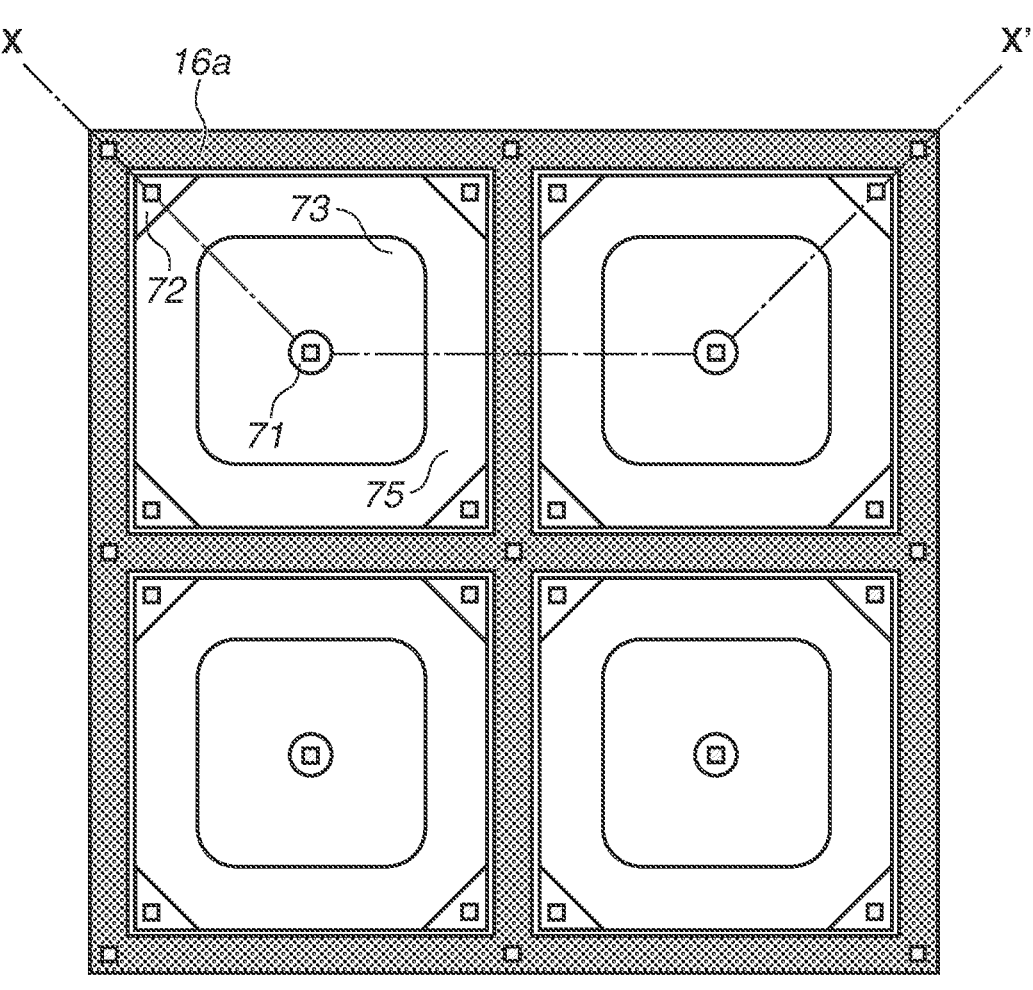
FIG. 7 is a schematic plan view of SPAD pixels according to a second exemplary embodiment.
Figure 8:
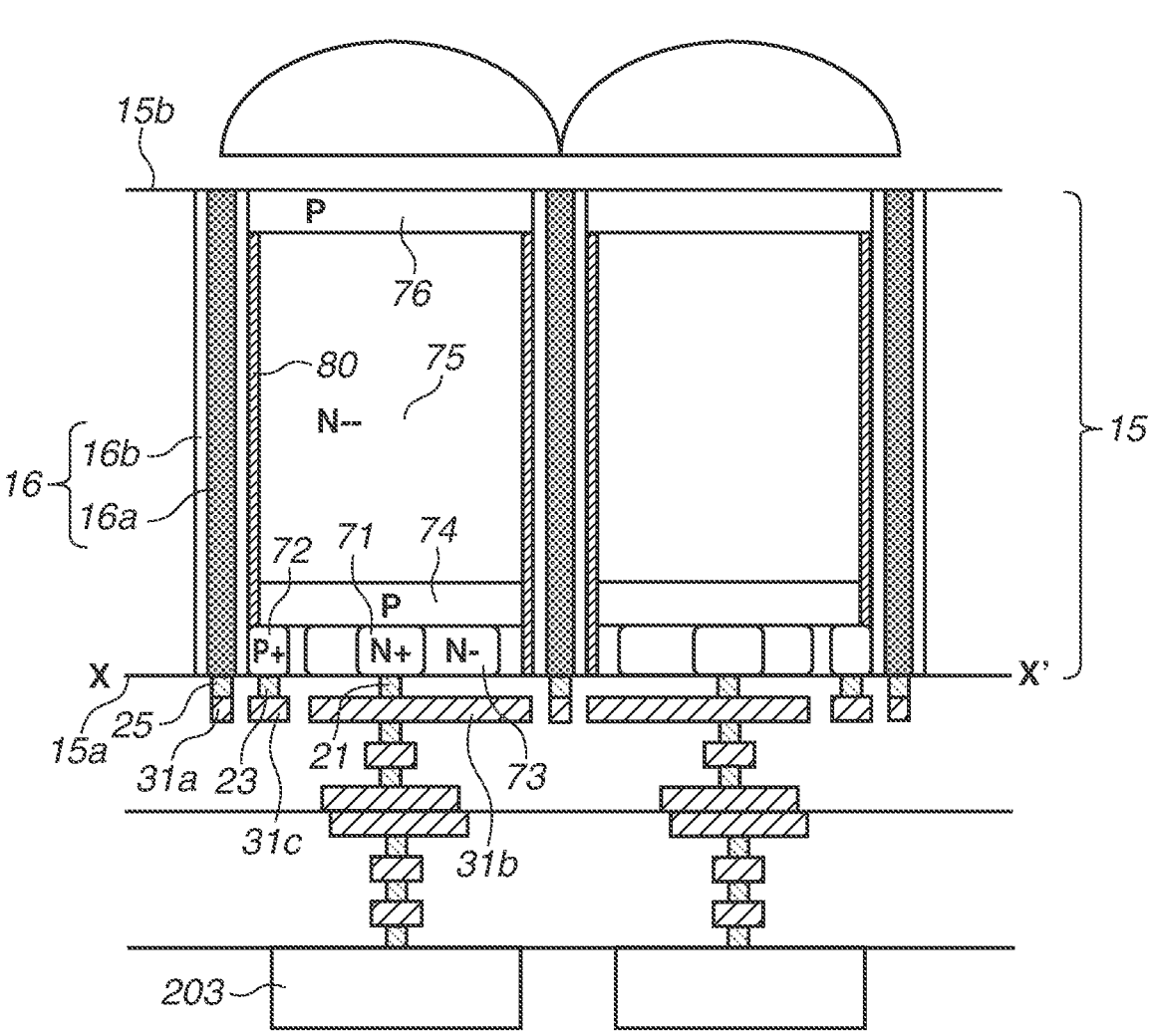
FIG. 8 is a schematic cross-sectional view of the SPAD pixels according to the second exemplary embodiment.

FIG. 7 is a schematic plan view of SPAD pixels according to a second exemplary embodiment. FIG. 8 is a schematic cross-sectional view along X-X' of the SPAD pixels in FIG. 7. The present exemplary embodiment is different from the first exemplary embodiment in that an avalanche diode according to the present exemplary embodiment is formed such that the semiconductor region 74 is in contact with the sidewall of the trench. The present exemplary embodiment is also different from the first exemplary embodiment in that the area of the semiconductor region 71 is smaller than that in the first exemplary embodiment, and a semiconductor region 73 of the first conductivity type having an impurity concentration lower than that of the semiconductor region 71 is disposed between the semiconductor regions 71 and 72. Components similar to those of the first exemplary embodiment are occasionally designated by the same signs and not described below.

As illustrated in FIG. 7, the area of the semiconductor region 71 is smaller than that of the semiconductor region 71 according to the first exemplary embodiment. For example, the width of the semiconductor region 71 can be ⅓₀ or more and ⅓ or less of the pixel pitch, and the area of the semiconductor region 71 can be preferably ⅟₂₀ or more and ¼ or less of that of the semiconductor region 71 according to the first exemplary embodiment. For example, the width of the semiconductor region 71 can be 0.2 μm or more and 2 μm or less. An avalanche multiplication region is a region where the semiconductor regions 71 and 74 overlap each other in a planar view and the vicinity of the region. The area of the semiconductor region 71 is thus made small, whereby it is possible to make a depletion layer region formed by the semiconductor regions 71 and 74 small. Thus, it is possible to make the avalanche multiplication region small and reduce the dark count rate.

In FIG. 8, the semiconductor region 74 is disposed in contact with the trench isolation portion 16. That is, the semiconductor region 74 is formed over the entire surface of the region partitioned by the trench isolation portion 16 in a planar view. At this time, the potential level varies in the semiconductor region 74 due to the influence of the semiconductor region 71. Specifically, in the semiconductor region 74, the potential level of a region that overlaps the semiconductor region 71 in a planar view is lower than the potential level of a region that does not overlap the semiconductor region 71 in a planar view. Consequently, it is possible to efficiently collect a signal charge in the avalanche multiplication region and make the aperture ratio higher than that in the first exemplary embodiment. For example, the aperture ratio of the photoelectric conversion element according to the present exemplary embodiment can be 70% or more and 100% or less.

In the present exemplary embodiment, the semiconductor regions 72 and 74 are in contact with each other. Then, the potential Vt3 is supplied also to the semiconductor region 74 via the contact plugs 23. The second conductivity type layer 80 connects the semiconductor regions 74 and 76.

A semiconductor region 73 is disposed around the semiconductor region 71 in a planar view. The semiconductor region 73 is a region that alleviates an electric field that can be generated between the semiconductor regions 71 and 72.

The semiconductor region 74 does not need to be formed over the entire surface of the region partitioned by the trench isolation portion 16. Although the details will be described below, a configuration may be employed in which the semiconductor region 74 is not formed in a region that overlaps the semiconductor region 71. Also in this case, it is possible to efficiently collect a signal charge in the avalanche multiplication region.

Based on the optical detection apparatus according to the present exemplary embodiment, similarly to the first exemplary embodiment, it is possible to prevent a decrease in the temporal resolution of signal reading as compared with the optical detection apparatus according to the comparison embodiment. Further, according to the present exemplary embodiment, it is possible to reduce noise as compared with the first exemplary embodiment. In the present exemplary embodiment, since the area of the semiconductor region 71 is small, it is possible to reduce noise. Further, in the present exemplary embodiment, it is possible to efficiently collect a signal charge in an avalanche multiplication region and improve sensitivity.

Figure 9:
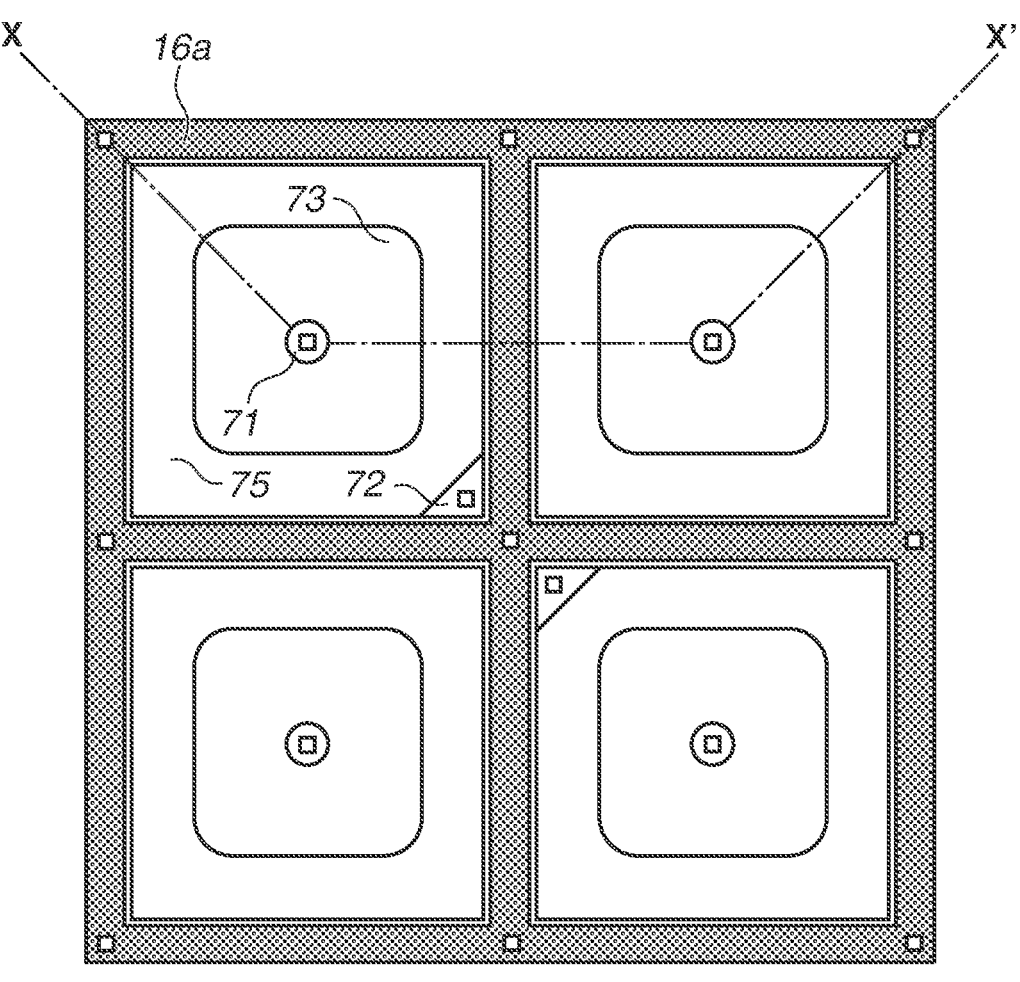
FIG. 9 is a schematic plan view of SPAD pixels according to a third exemplary embodiment.
Figure 10:
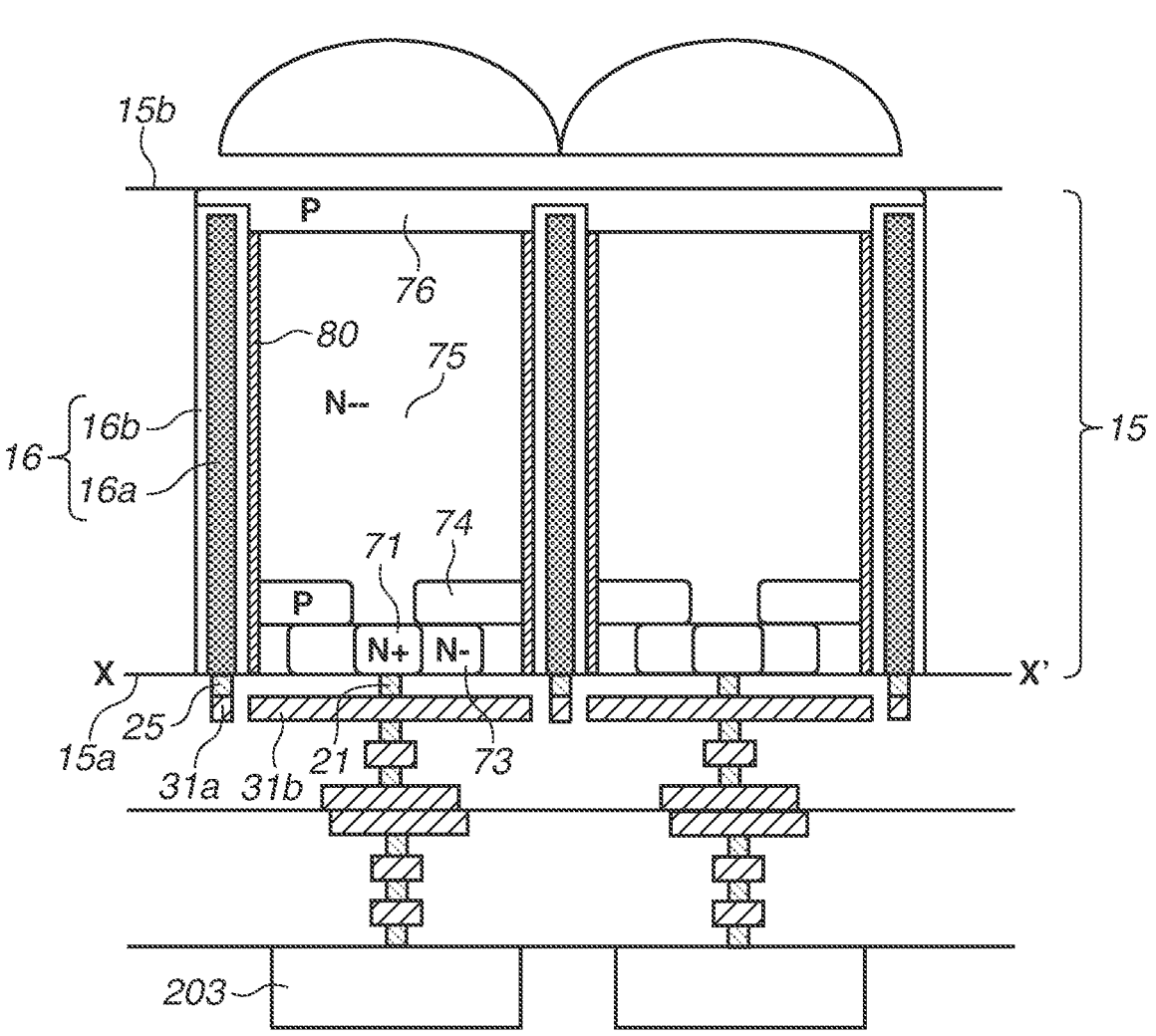
FIG. 10 is a schematic cross-sectional view of the SPAD pixels according to the third exemplary embodiment.

FIG. 9 is a schematic plan view of SPAD pixels according to a third exemplary embodiment. FIG. 10 is a schematic cross-sectional view along X-X' of the SPAD pixels in FIG. 9. The present exemplary embodiment is different from the second exemplary embodiment in that in each of the SPAD pixels according to the present exemplary embodiment, the trench isolation portion 16 does not penetrate the semiconductor substrate 15, and the present exemplary embodiment is different from the second exemplary embodiment in the positions where a semiconductor region 72 and a contact plug 23 are disposed and the number of these positions. The present exemplary embodiment is also different from the second exemplary embodiment in that the semiconductor region 74 is not formed on the entire surface of the region partitioned by the trench isolation portion 16 in a planar view. Components similar to those of the second exemplary embodiment are occasionally designated by the same signs and not described below.

As illustrated in FIG. 10, in the present exemplary embodiment, the trench isolation portion 16 does not penetrate the semiconductor substrate 15. That is, the formation of the trench is stopped in the middle of the semiconductor substrate 15. One end of the trench on the second surface 15b side and the semiconductor region 76 are in contact with each other. The semiconductor region 76 is not isolated by the trench isolation portion 16. That is, the trench isolation portion 16 includes side surfaces and an upper surface. Then, the semiconductor region 76 is continuously formed in a plurality of photoelectric conversion elements and shared by the plurality of photoelectric conversion elements.

As illustrated in FIG. 9, a plurality of photoelectric conversion elements shares a semiconductor region 72 and a contact plug 23. That is, a potential is supplied from a semiconductor region 72 and a contact plug 23 disposed in a single photoelectric conversion element to second conductivity type layers 80 and a semiconductor region 76 of a plurality of photoelectric conversion elements. If a potential is supplied to a contact plug 23 provided in a certain photoelectric conversion element, the semiconductor regions 72 and 76 become conductive with each other via the second conductivity type layer 80. Since the semiconductor region 76 is continuously formed in a plurality of photoelectric conversion elements, the potential from the contact plug 23 is supplied from the semiconductor region 76 to the second conductivity type layers 80 of the photoelectric conversion elements.

It is desirable that in the pixel where the trench isolation portion 16 and the semiconductor region 72 are disposed, the trench isolation portion 16 and the semiconductor region 72 should be disposed near a photoelectric conversion element with which the contact plug 23 is shared in a planar view. Consequently, it is possible to reduce parasitic resistance in an electrical path through which the contact plug 23 supplies a potential to a semiconductor region 72 of the photoelectric conversion element with which the contact plug 23 is shared, and prevent a decrease in performance due to an instantaneous voltage drop caused by an avalanche current.

Based on the optical detection apparatus according to the present exemplary embodiment, similarly to each of the above exemplary embodiments, it is possible to prevent a decrease in the temporal resolution of signal reading as compared with the optical detection apparatus according to the comparison embodiment. In a case where the trench isolation portion 16 penetrates the semiconductor substrate 15, it is necessary to dispose a contact plug 23 in each photoelectric conversion element. Thus, it is difficult to make the area of the pixel array unit 111 small According to the present exemplary embodiment, a contact plug 23 is shared by a plurality of photoelectric conversion elements. Thus, it is possible to make the pixel array unit 111 smaller than in a case where the trench isolation portion 16 penetrates the semiconductor substrate 15.

Figure 11:
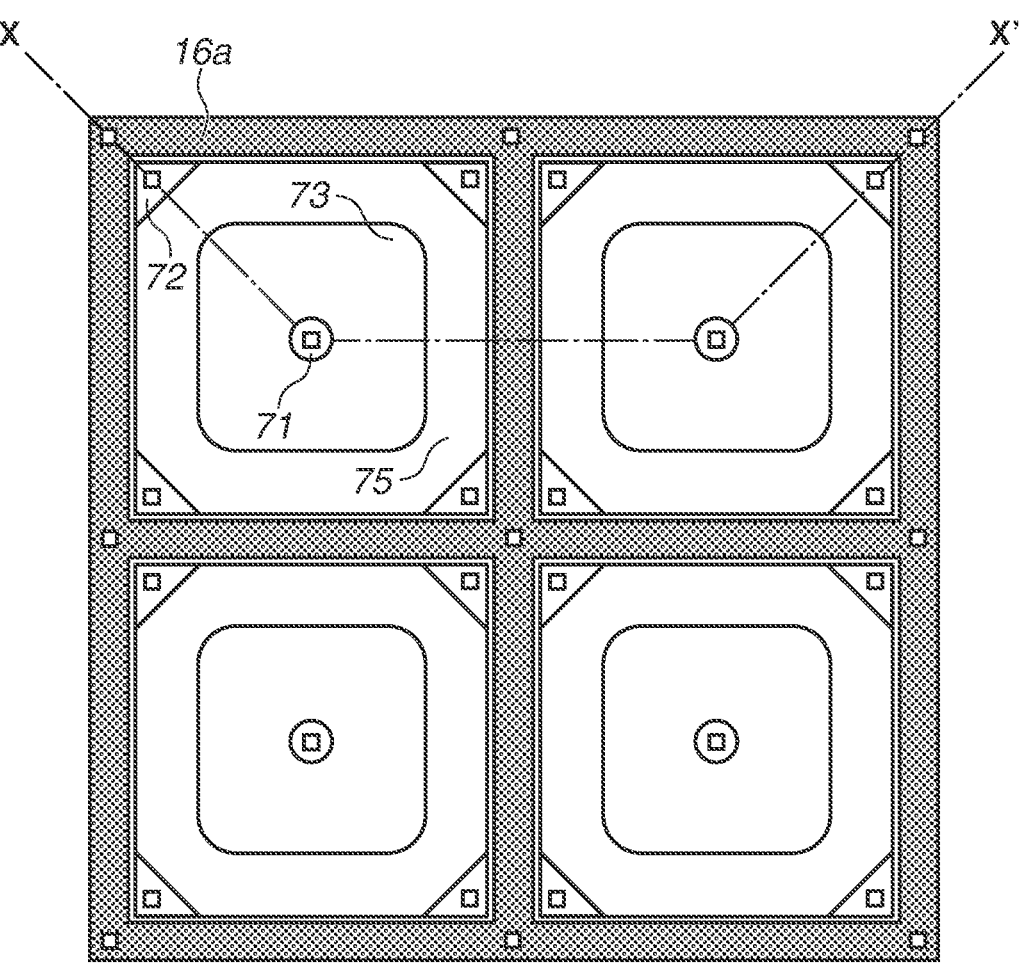
FIG. 11 is a schematic plan view of SPAD pixels according to a fourth exemplary embodiment.
Figure 12:
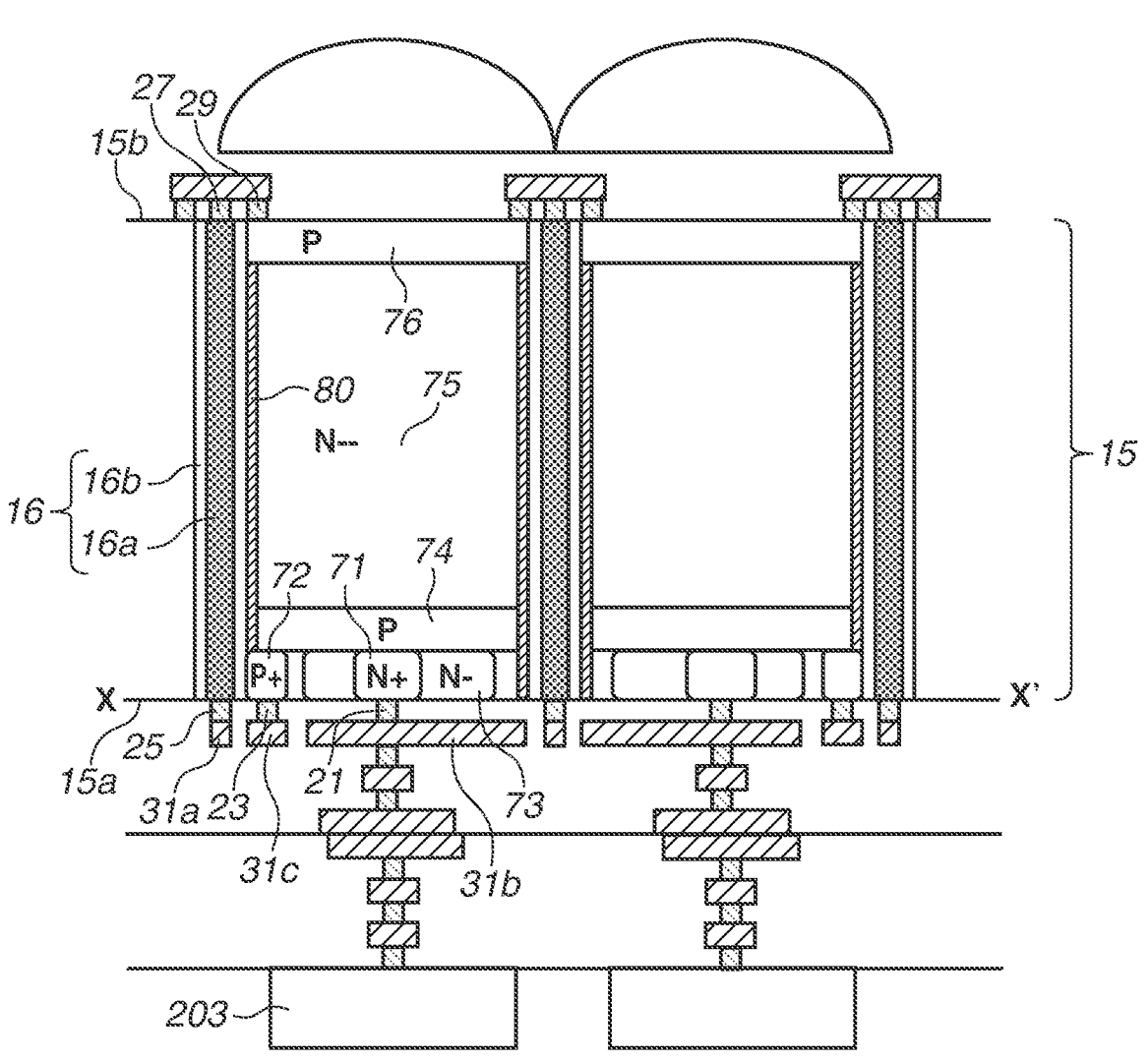
FIG. 12 is a schematic cross-sectional view of the SPAD pixels according to the fourth exemplary embodiment.

FIG. 11 is a schematic plan view of SPAD pixels according to a fourth exemplary embodiment. FIG. 12 is a schematic cross-sectional view along X-X' of the SPAD pixels in FIG. 11. The present exemplary embodiment is different from the second exemplary embodiment in that to each of the SPAD pixels according to the present exemplary embodiment, a potential is supplied also from the second surface 15b. Components similar to those of the second exemplary embodiment are occasionally designated by the same signs and not described below.

In the fourth exemplary embodiment, to the second surface 15b of the semiconductor substrate 15, a contact plug 27 that supplies a potential to the conductor 16a, and a contact plug 29 that supplies a potential to the semiconductor region 76 are connected. It is desirable that the same potential should be supplied to the contact plugs 23, 25, 27, and 29. This is because this enables an operation with two power supplies, namely a power supply that supplies power to the contact plug 21 and a power supply that supplies power to the contact plugs 23, 25, 27, and 29.

Based on the optical detection apparatus according to the present exemplary embodiment, similarly to each of the above exemplary embodiments, it is possible to prevent a decrease in the temporal resolution of signal reading as compared with the optical detection apparatus according to the comparison embodiment. The contact plugs 27 and 29 are disposed, whereby it is possible to supply potentials from both the first surface 15*a* and the second surface 15*b*. Thus, even in a case where the semiconductor substrate 15 has a great depth, it is possible to stably supply potentials to the conductor 16*a* and the semiconductor region 76.

Figure 13:
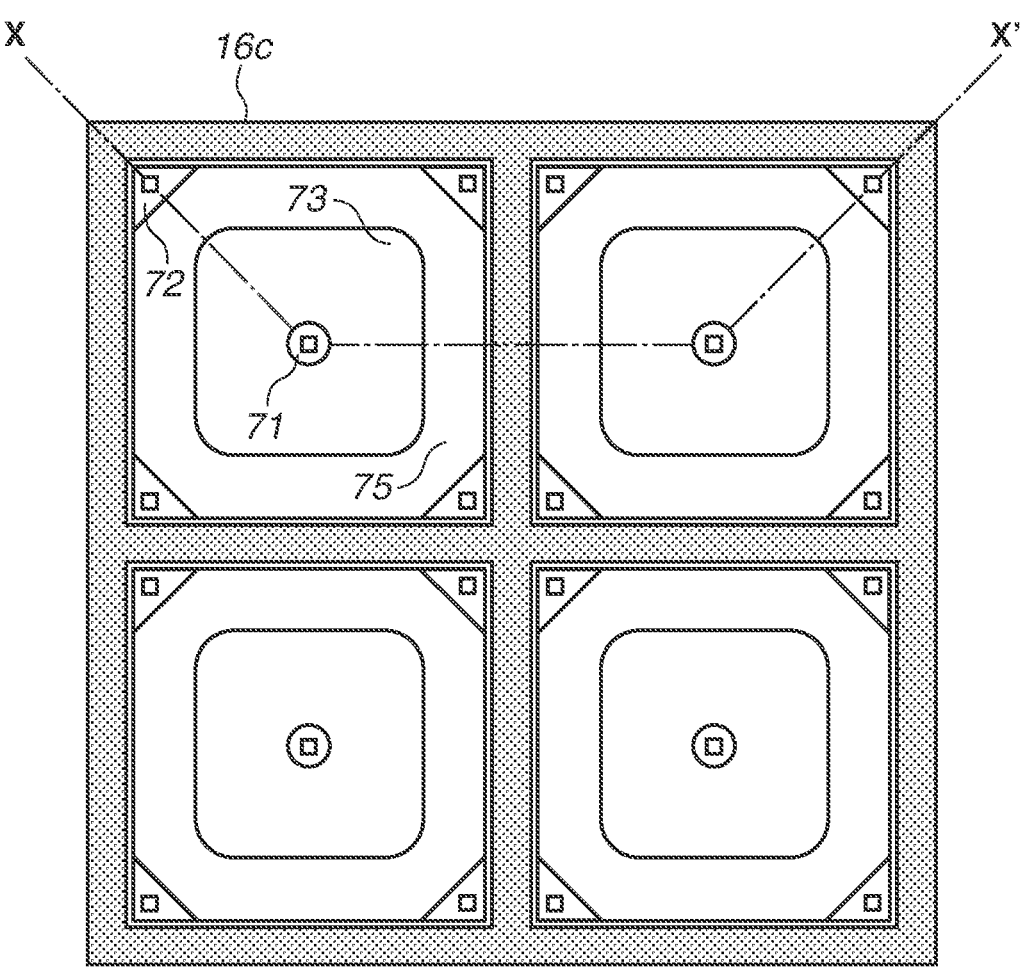
FIG. 13 is a schematic plan view of SPAD pixels according to a fifth exemplary embodiment.
Figure 14:
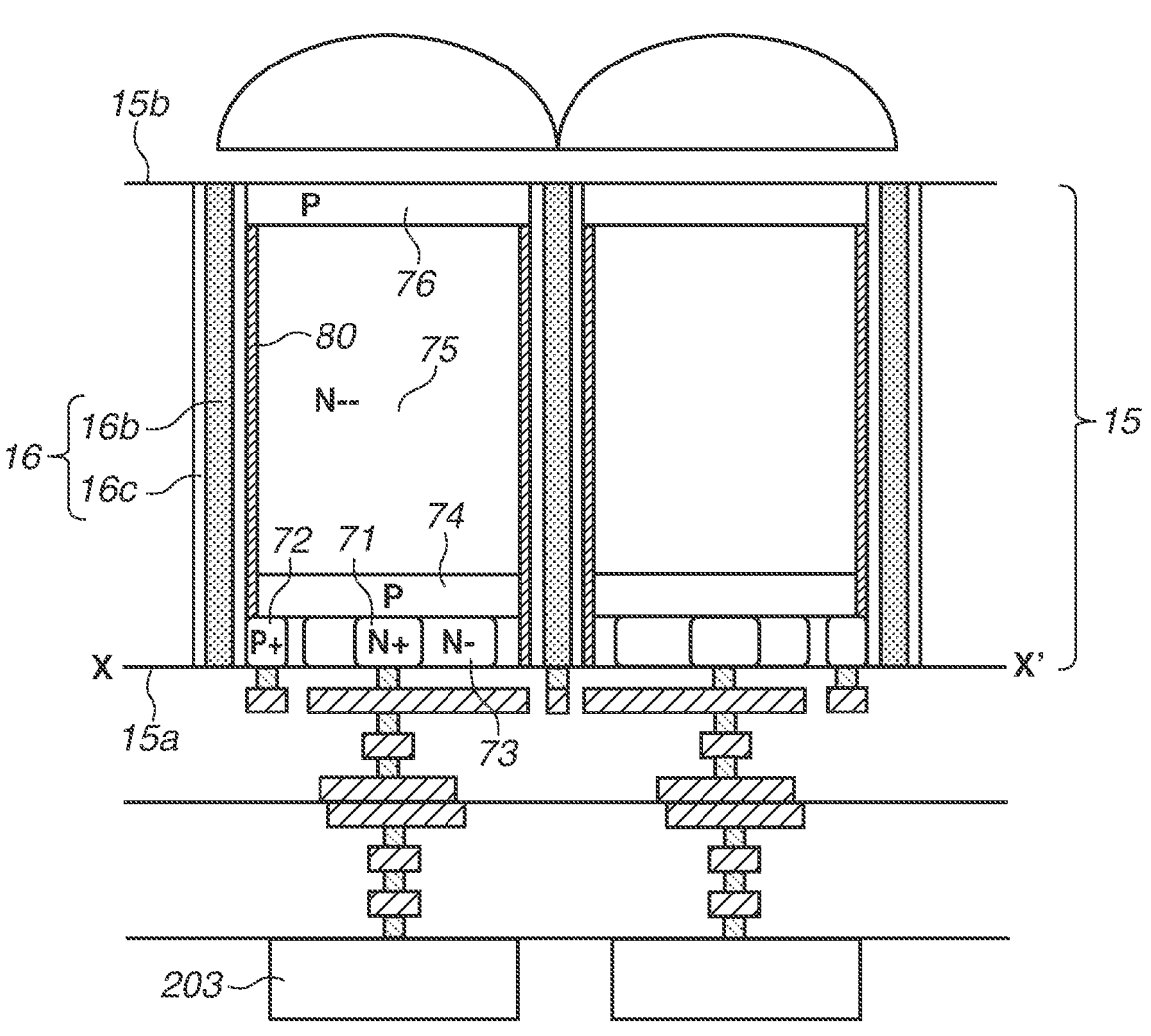
FIG. 14 is a schematic cross-sectional view of the SPAD pixels according to the fifth exemplary embodiment.

FIG. 13 is a schematic plan view of SPAD pixels according to a fifth exemplary embodiment. FIG. 14 is a schematic cross-sectional view along X-X' of the SPAD pixels in FIG. 13. The present exemplary embodiment is different from the second exemplary embodiment in that in each of the SPAD pixels according to the present exemplary embodiment, the second conductivity type layer 80 is formed by a dielectric having a negative fixed charge in the trench isolation portion 16. Components similar to those of the second exemplary embodiment are occasionally designated by the same signs and not described below.

The trench isolation portion 16 according to the present exemplary embodiment includes a dielectric 16*c* having a negative fixed charge. In FIG. 14, the dielectric 16*c* (a dielectric layer) is disposed between the insulator 16*b* and the photoelectric conversion element. That is, the photoelectric conversion element and the dielectric 16*c* are in contact with each other. As the dielectric 16*c* having a negative fixed charge, a metal oxide layer is suitable. The dielectric 16*c* having a negative fixed charge is placed near the sidewall of the trench isolation portion 16, whereby charges of the second conductivity type are accumulated on the sidewall of the trench isolation portion 16, and the second conductivity type layer 80 is formed.

The dielectric 16*c* is, for example, a hafnium oxide layer, an aluminum oxide layer, a zirconium oxide layer, a titanium oxide layer, a tantalum oxide layer, or a ruthenium oxide layer. Particularly, it is desirable that the dielectric 16*c* should be an aluminum oxide layer or a hafnium oxide layer. The suitable width of the dielectric 16*c* is 5 nm to 20 nm.

In FIG. 14, the dielectric 16*c* is disposed such that the sidewall of the trench isolation portion 16 and the dielectric 16*c* are in contact with each other. The configuration of the trench isolation portion 16, however, is not limited to this. Also with the configuration of the trench isolation portion 16 described below, it is possible to obtain the effect of the present exemplary embodiment.

For example, a thin insulator 16*b* may be disposed between the dielectric 16*c* and the sidewall of the trench isolation portion 16. In this case, the thickness of the insulator 16*b* is less than 50 nm. The thin insulator 16*b* may be, for example, a silicon oxide layer.

Alternatively, the trench isolation portion 16 may be composed only of the dielectric 16*c*. That is, the dielectric 16*c* may be embedded in the entirety of the trench of the trench isolation portion 16. Also in this case, the second conductivity type layer 80 can be formed. In terms of a reduction in crosstalk between pixels, it is desirable that the trench isolation portion 16 should include layers having different refractive indices as illustrated in FIG. 14. Consequently, it is possible to prevent light incident from the second surface 15*b* or light emitted by avalanche light emission from traveling toward an adjacent pixel. In FIG. 14, the insulator 16*b* and the dielectric 16*c* are embedded in the trench isolation portion 16. Alternatively, a gap may be provided in the trench isolation portion 16. For example, the dielectric 16*c* may be disposed between the gap and the trench isolation portion 16 in a cross section view.

Based on the optical detection apparatus according to the present exemplary embodiment, similarly to each of the above exemplary embodiments, it is possible to prevent a decrease in the temporal resolution of signal reading as compared with the optical detection apparatus according to the comparison embodiment. Further, it is possible to form the second conductivity type layer 80 with the dielectric 16*c* without supplying a potential to the trench isolation portion 16. Since it is not necessary to supply a potential to the trench isolation portion 16, it is possible to reduce the number of contact plugs.

Figure 15:
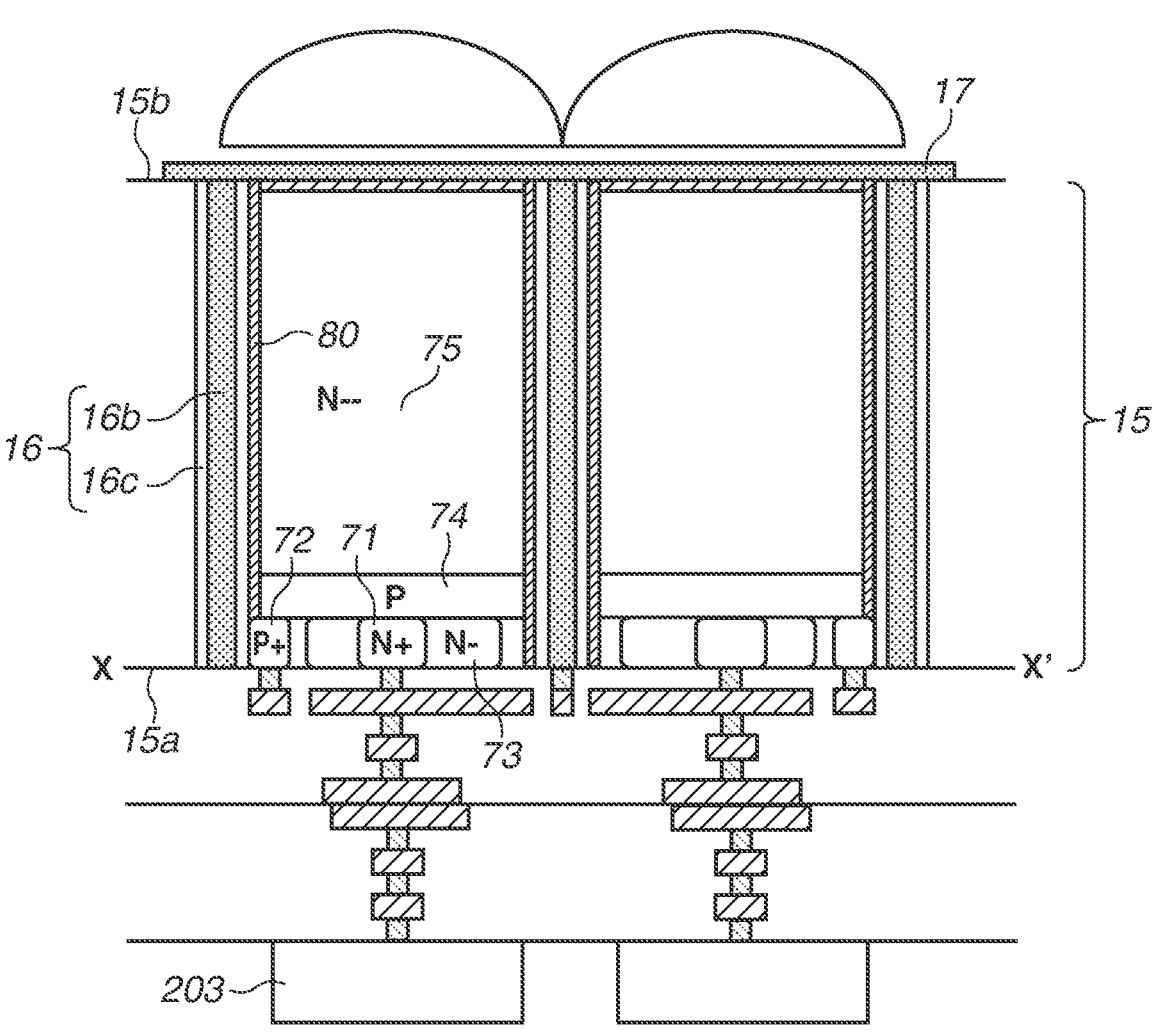
FIG. 15 is a schematic cross-sectional view of SPAD pixels according to a variation of the fifth exemplary embodiment.

FIG. 15 illustrates a variation of the present exemplary embodiment. In the variation, a dielectric 17 having a negative fixed charge (a second dielectric layer) is disposed on the second surface 15*b*. In FIG. 15, the dielectric 17 is disposed in contact with the second surface 15*b*. Alternatively, similarly to the above description, an insulator may be disposed between the dielectric 17 and the second surface 15*b*.

As the dielectric 17, the same material as the dielectric 16*c* may be used, or a different material from the dielectric 16*c* may be used.

Also in the variation, it is possible to obtain an effect similar to that in the above description. Further, in the variation, since the semiconductor region 76 is not formed, it is possible to make a region where charges are accumulated smaller than in the above exemplary embodiments. Thus, it is possible to reduce a decrease in the temporal resolution as compared with a case where the semiconductor region 76 is formed.

Figure 16:
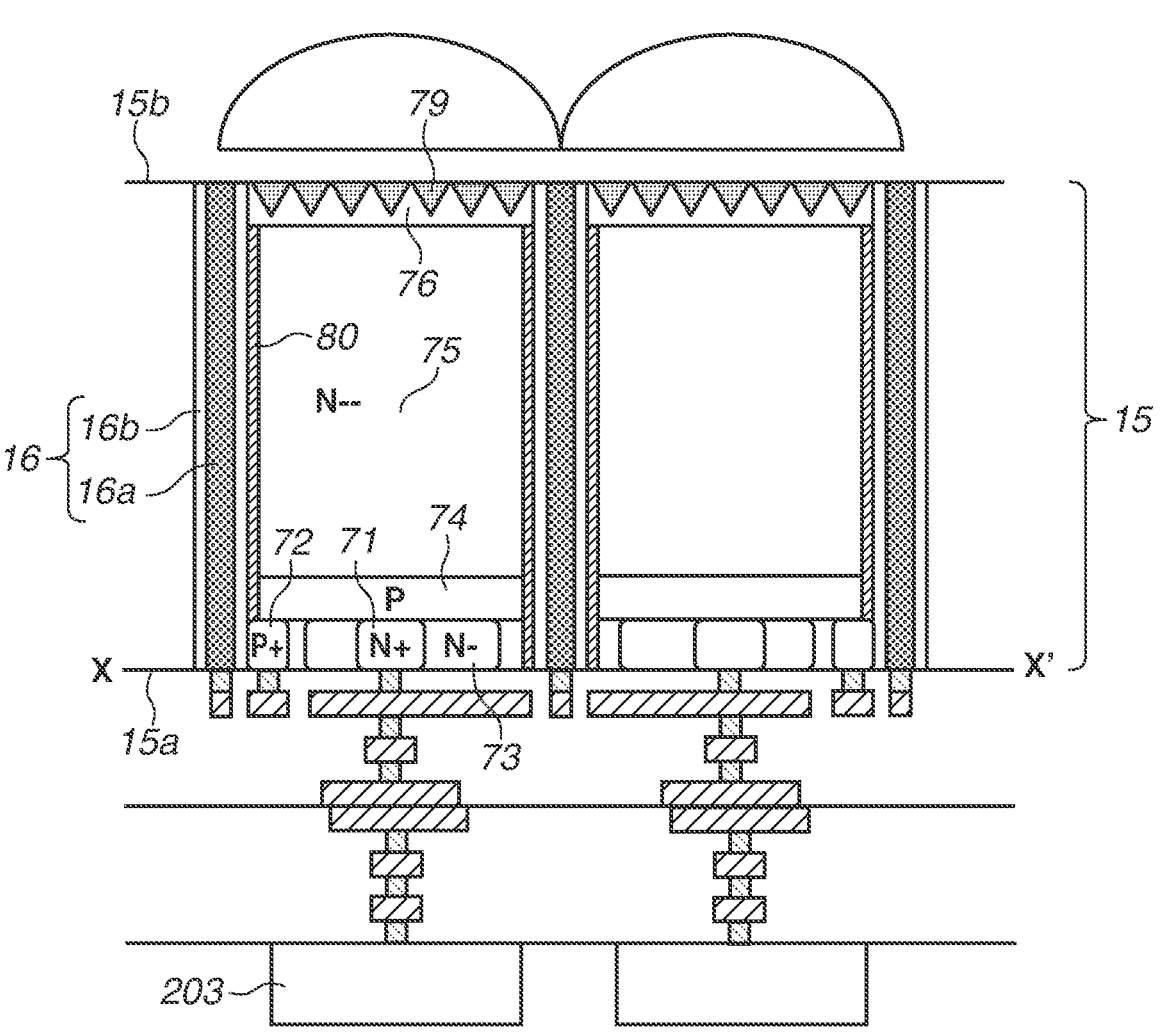
FIG. 16 is a schematic cross-sectional view of SPAD pixels according to a sixth exemplary embodiment.
Figure 17:
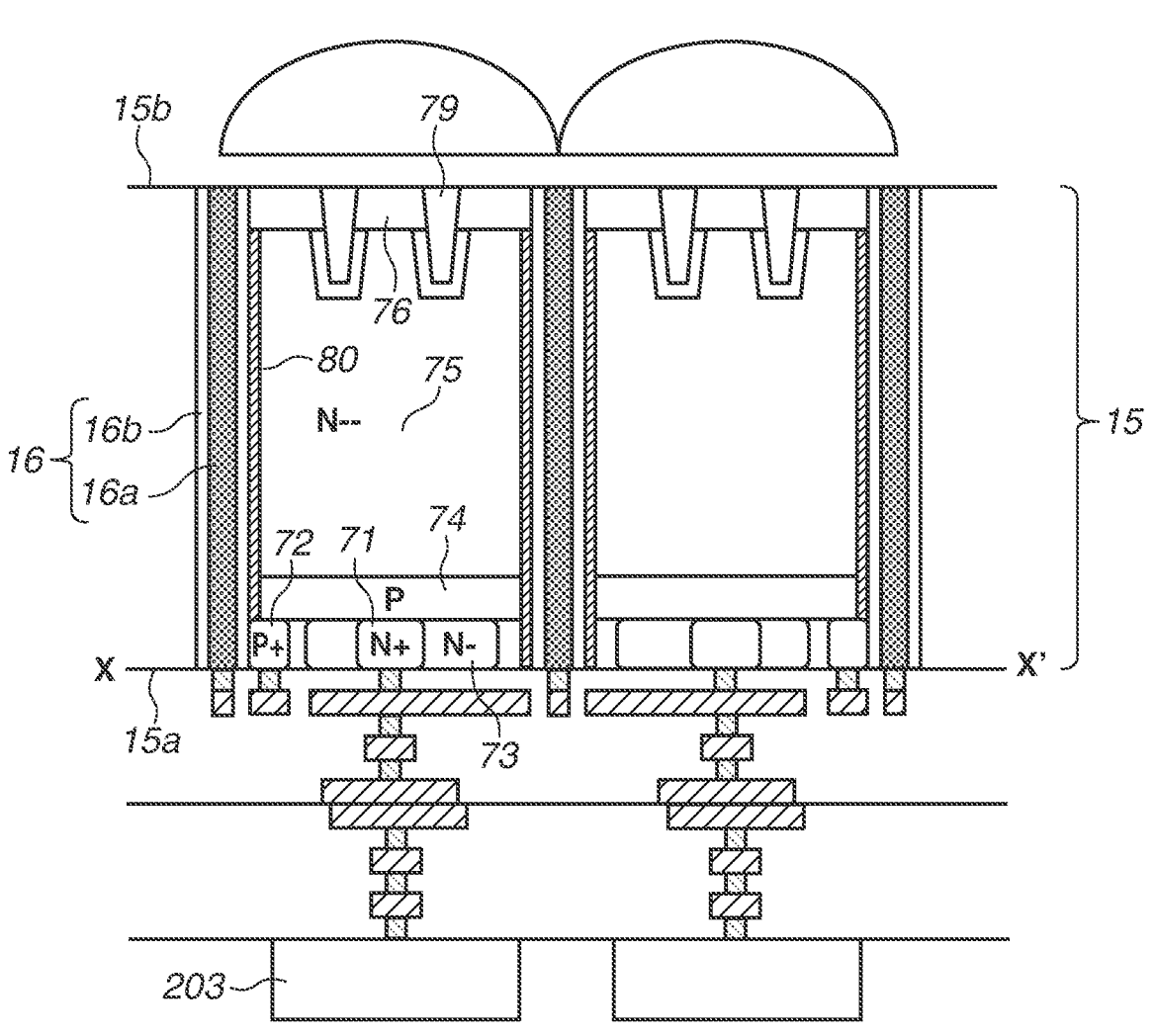
FIG. 17 is a schematic cross-sectional view of SPAD pixels according to a variation of the sixth exemplary embodiment.

FIGS. 16 and 17 are schematic cross-sectional views of SPAD pixels according to a sixth exemplary embodiment. Planar views are similar to that in FIG. 7 and therefore are omitted. The present exemplary embodiment is different from the second exemplary embodiment in that in each of the SPAD pixels according to the present exemplary embodiment, the second surface 15*b* has a scattering structure 79. Components similar to those of the second exemplary embodiment are occasionally designated by the same signs and not described below.

On the second surface 15*b*, a plurality of recessed portions is provided as a scattering structure 79. Consequently, it is possible to scatter light incident from the second surface 15*b*, thereby increasing the length of the optical path to the first surface 15*a*. In a case where the incident light is infrared (IR) light, it is necessary to increase the distance from the position where the IR light is photoelectrically converted and reduce light that comes out without being photoelectrically converted. Thus, in the case of IR light, this effect is remarkable.

The number and the shapes of recessed portions provided in the scattering structure 79 can be appropriately designed. As illustrated in FIG. 16, in a cross section view, the shape of each recessed portion may be a triangle, and the recessed portions may be provided in the entirety of the second surface 15*b* in the pixel. Alternatively, the shape of each recessed portion may be a pyramid shape. As illustrated in FIG. 17, the recessed portions may be provided in a part of the second surface 15*b* in the pixel. Based on the configuration in FIG. 16, it is possible to make the scattering and diffraction angles obtuse with respect to the incidence angle of light. Thus, it is possible to improve infrared sensitivity while preventing the leakage of light to an adjacent pixel. According to the configuration in FIG. 17, it is possible to make the incidence and diffraction angles of light acute and obtain a greater effect of improving infrared sensitivity.

As illustrated in FIG. 16, it is desirable that the width of a single recessed portion should be 1/30 or more and 1/3 or less of the width of the pixel, for example. In another aspect, the width of a single recessed portion can be 10 nm or more and 1 µm or less, for example. The depth of a single recessed portion can be 1/50 or more and 1/3 or less of the distance from the first surface 15a to the second surface 15b, for example.

The shape of each recessed portion can be, for example, a triangle or a trapezoid. The vertices of the triangle or the trapezoid may be rounded. On the second surface 15b, recessed portions do not need to be continuously formed. For example, a region where a recessed portion is not formed may exist between recessed portions or between a recessed portion and the trench isolation portion 16. The recessed portions can be formed by a known method such as dry etching.

In each recessed portion of the scattering structure 79, an insulator is disposed. As the material of the insulator, for example, silicon oxide or silicon nitride can be used.

Based on the optical detection apparatus according to the present exemplary embodiment, similarly to each of the above exemplary embodiments, it is possible to prevent a decrease in the temporal resolution of signal reading as compared with the optical detection apparatus according to the comparison embodiment. Particularly, in a case where the scattering structure 79 is provided, the probability that a photocharge is excited near the trench increases as compared with a case where the scattering structure 79 is not provided. Thus, the effect of preventing a decrease in the temporal resolution according to the present disclosure is great. Further, it is possible to lengthen the optical path to an avalanche multiplication region by the scattering structure 79 scattering light. Thus, it is possible to efficiently photoelectrically convert infrared light.

Figure 18:
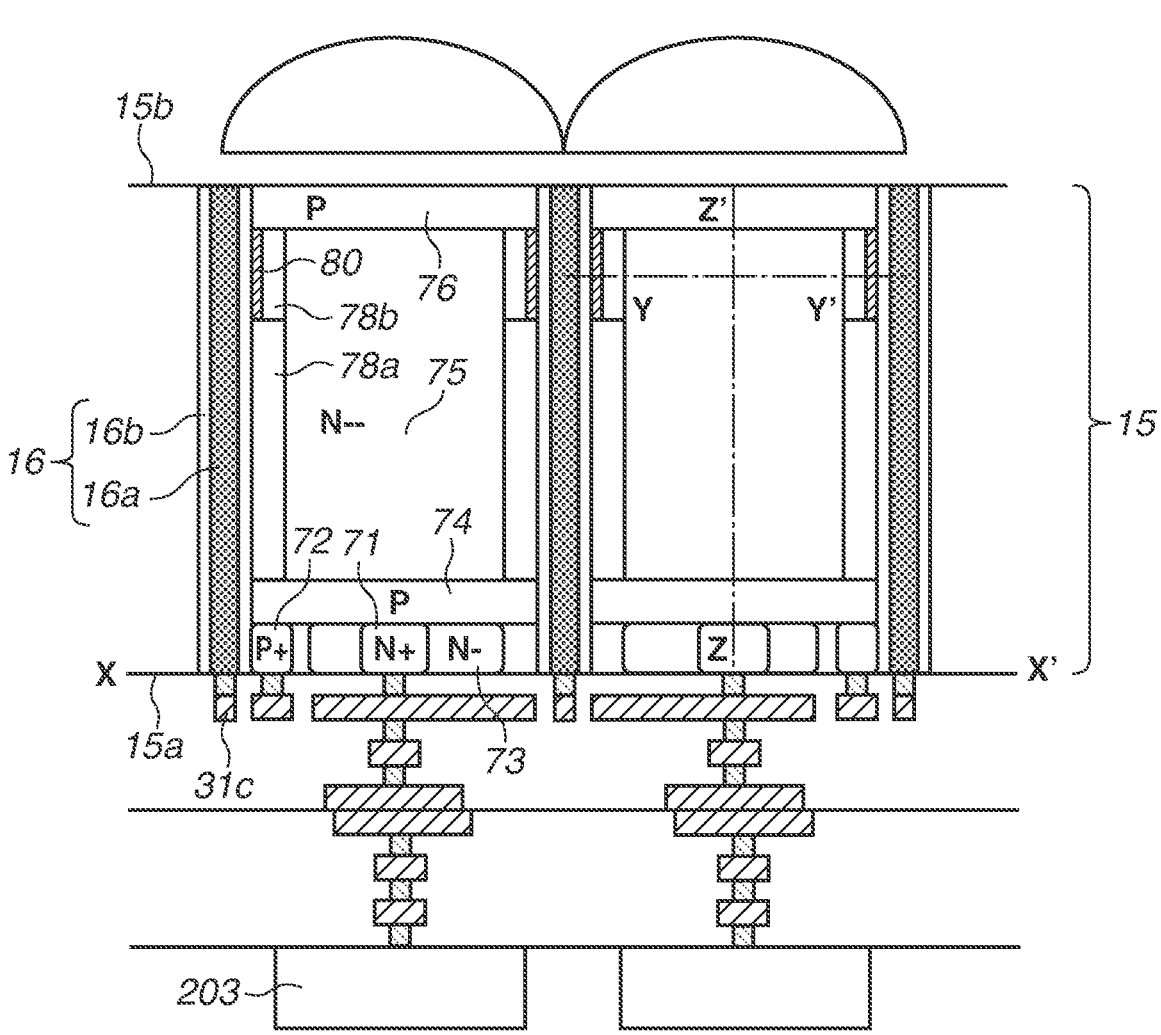
FIG. 18 is a schematic cross-sectional view of SPAD pixels according to a seventh exemplary embodiment.
Figure 19A:
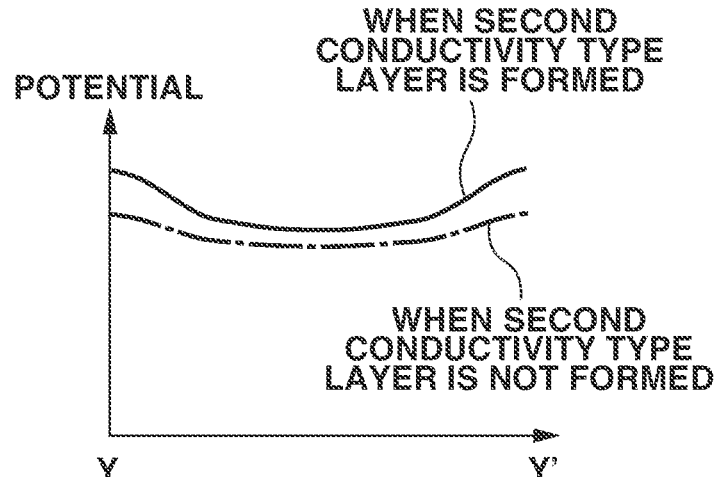
FIGS. 19A and 19B are potential diagrams of the SPAD pixels according to the seventh exemplary embodiment.
Figure 19B:
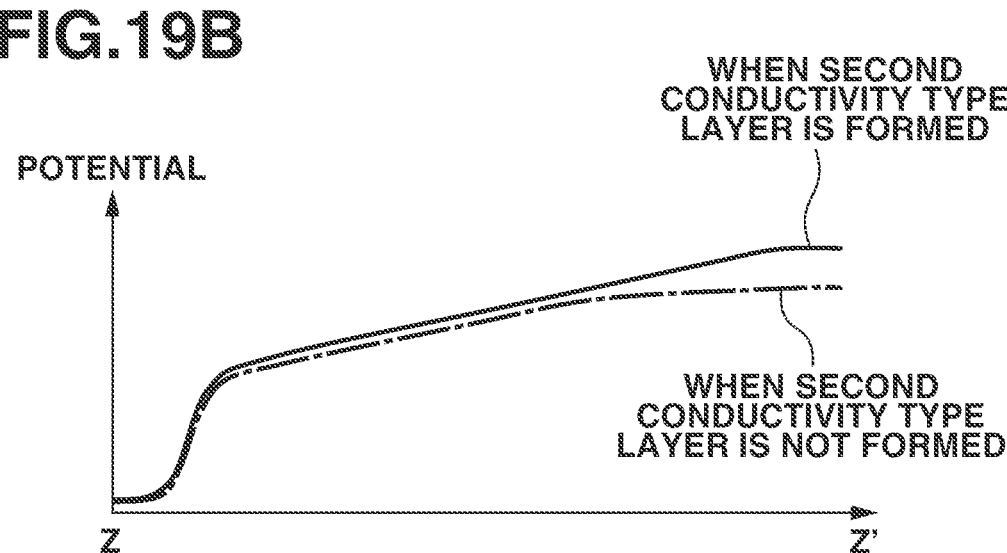

FIG. 18 is a schematic cross-sectional view of SPAD pixels according to a seventh exemplary embodiment. The planar view is similar to that in FIG. 7 and therefore is omitted. FIG. 19A is a potential diagram along Y-Y' in FIG. 18. FIG. 19B is a potential diagram along Z-Z' in FIG. 18. The present exemplary embodiment is different from the second exemplary embodiment in that in each of the SPAD pixels according to the present exemplary embodiment, a semiconductor region of the second conductivity type is formed in a part of the sidewall of the trench isolation portion 16, and the second conductivity type layer 80 is formed in another part of the trench isolation portion 16 by applying a voltage to the conductor 16a. Components similar to those of the second exemplary embodiment are occasionally designated by the same signs and not described below.

In the present exemplary embodiment, a semiconductor region of the second conductivity type is formed in the sidewall of the trench isolation portion 16 by ion implantation. At this time, to a predetermined depth in the trench isolation portion 16, impurities are implanted at a first impurity concentration. At a position deeper than the predetermined depth, impurities are implanted at a second impurity concentration lower than the first impurity concentration. This forms a semiconductor region 78b having a concentration lower than the impurity concentration at which a semiconductor region 78a is formed. The impurity concentration is thus made low in a deep portion, whereby it is possible to prevent the width of the semiconductor region 78b from being great. Meanwhile, if the impurity concentration is made low, a potential supplied from the contact plug to the semiconductor region 76 may not be sufficiently transmitted.

Thus, in the present exemplary embodiment, in the semiconductor region 78b having a lower impurity concentration, the second conductivity type layer 80 in the sidewall of the trench isolation portion 16 is formed by supplying a potential to the conductor 16a of the trench isolation portion 16. Consequently, even in a case where a potential cannot be sufficiently transmitted by the semiconductor region 78b alone, it is possible to transmit the potential with the assistance of the semiconductor region 78b.

As illustrated in FIGS. 19A and 19B, also in the present exemplary embodiment, it is possible to reduce a region where a potential is flat when the second conductivity type layer 80 is formed. Thus, it is possible to efficiently read a charge.

In FIG. 18, in the sidewall of the trench isolation portion 16, the semiconductor regions 78 are continuously disposed from the semiconductor region 74 to the semiconductor region 76. The present disclosure is not limited to this. Alternatively, the semiconductor regions 78 may be disposed in a part of the sidewall of the trench isolation portion 16, and the semiconductor regions 78 may not be disposed in another part. For example, a configuration may be employed in which the semiconductor regions 78 are not provided in a deep portion close to the substrate 15b. Then, the potential of the semiconductor regions 78 may be transmitted to the semiconductor region 76 via the second conductivity type layer 80.

Based on the optical detection apparatus according to the present exemplary embodiment, similarly to each of the above exemplary embodiments, it is possible to prevent a dark charge generated from an interface while preventing a decrease in the temporal resolution of signal reading as compared with the optical detection apparatus according to the comparison embodiment.

Figure 20:
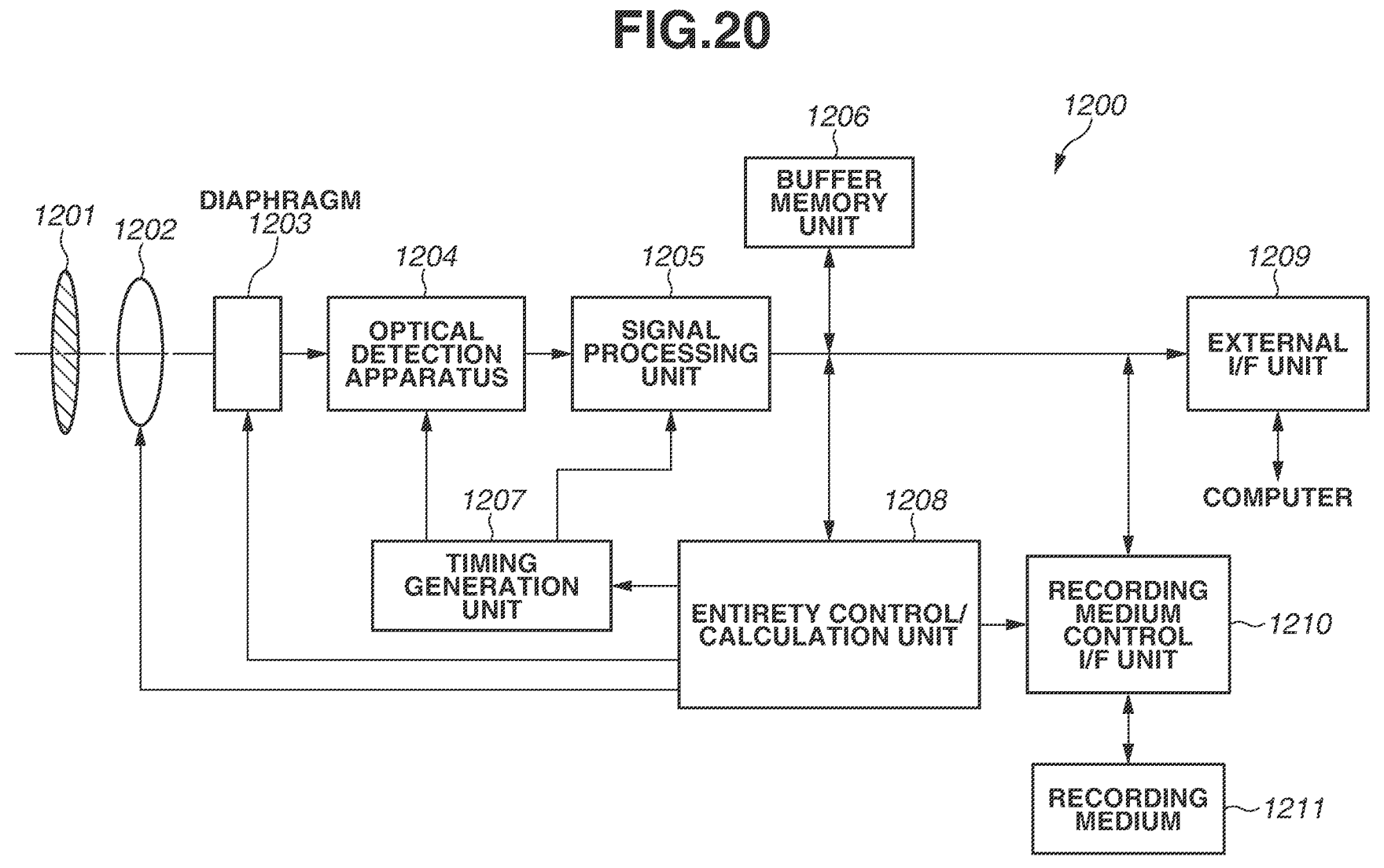

FIG. 20 is a block diagram illustrating the configuration of an optical detection system 1200 according to an eighth exemplary embodiment. The optical detection system 1200 according to the present exemplary embodiment includes an optical detection apparatus 1204. To the optical detection apparatus 1204, any of the optical detection apparatuses described in the above exemplary embodiments can be applied. The optical detection system 1200 can be used as, for example, an imaging system. Specific examples of the imaging system include a digital still camera, a digital camcorder, and a monitoring camera. FIG. 20 illustrates a digital still camera as an example of the optical detection system 1200.

The optical detection system 1200 illustrated in FIG. 20 includes the optical detection apparatus 1204, a lens 1202 that forms an optical image of an object on the optical detection apparatus 1204, a diaphragm 1203 that makes the amount of light passing through the lens 1202 variable, and a barrier 1201 that protects the lens 1202. The lens 1202 and the diaphragm 1203 are an optical system for collecting light on the optical detection apparatus 1204.

The optical detection system 1200 includes a signal processing unit 1205 that processes an output signal output from the optical detection apparatus 1204. The signal processing unit 1205 performs a signal processing operation for performing various types of correction and compression on an input signal where necessary and outputting the resulting signal. Further, the optical detection system 1200 includes a buffer memory unit 1206 that temporarily stores image data, and an external interface unit (external I/F unit) 1209 that is used to communicate with an external computer. Further, the optical detection system 1200 includes a recording medium 1211 such as a semiconductor memory in or from which captured data is recorded or read, and a recording medium control interface unit (e.g., recording medium control I/F unit) 1210 that is used to record or read captured data in or from the recording medium 1211. The recording medium 1211 may be built into the optical detection system 1200, or may be attachable to and detachable from the optical detection system 1200. The optical detection system 1200 may wirelessly communicate with the recording medium 1211 via the recording medium control I/F unit 1210, or may wirelessly communicate via the external I/F unit 1209.

Further, the optical detection system 1200 includes an entirety control/calculation unit 1208 that performs various calculations and also controls the entirety of the digital still camera, and a timing generation unit 1207 that outputs various timing signals to the optical detection apparatus 1204 and the signal processing unit 1205. The timing signals may be input from outside, and the optical detection system 1200 only needs to include at least the optical detection apparatus 1204 and the signal processing unit 1205 that processes an output signal output from the optical detection apparatus 1204. As described in the fourth exemplary embodiment, the timing generation unit 1207 may be provided in the optical detection apparatus 1204. The entirety control/calculation unit 1208 and the timing generation unit 1207 may be configured to perform a part or all of the control function of the optical detection apparatus 1204.

The optical detection apparatus 1204 outputs an image signal to the signal processing unit 1205. The signal processing unit 1205 performs predetermined signal processing on the image signal output from the optical detection apparatus 1204 and outputs image data. The signal processing unit 1205 generates an image using the image signal. The signal processing unit 1205 may perform a distance measurement calculation on a signal output from the optical detection apparatus 1204. The signal processing unit 1205 and the timing generation unit 1207 may be provided in the optical detection apparatus 1204. That is, the signal processing unit 1205 and the timing generation unit 1207 may be provided on a substrate on which pixels are disposed. Alternatively, a configuration may be employed in which the signal processing unit 1205 and the timing generation unit 1207 are provided on another substrate. An imaging system is configured using each of the optical detection apparatuses according to the above exemplary embodiments, whereby it is possible to achieve an imaging system capable of acquiring an image with better quality.

Figure 21:
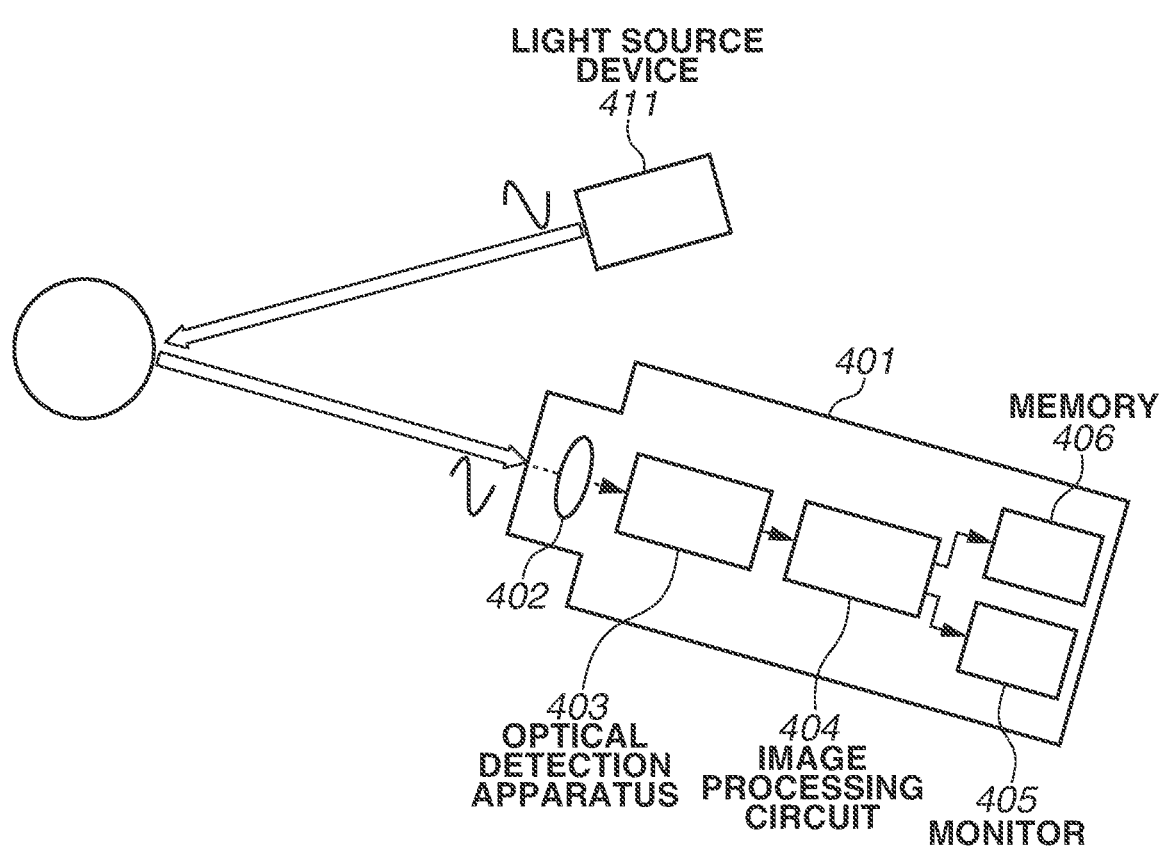
FIG. 21 is a block diagram of an optical detection system according to a ninth exemplary embodiment.

In a ninth exemplary embodiment, FIG. 21 is a block diagram illustrating an example of the configuration of a range image sensor as an electronic device using each of the optical detection apparatuses according to the above exemplary embodiments.

As illustrated in FIG. 21, a range image sensor 401 includes an optical system 402, an optical detection apparatus 403, an image processing circuit 404, a monitor 405, and a memory 406. Then, the range image sensor 401 receives light (modulated light or pulsed light) projected from a light source device 411 toward an object and reflected from the surface of the object and thereby can acquire a range image according to the distance from the object.

The optical system 402 includes one or more lenses. The optical system 402 guides image light (e.g., incident light) from the object to the optical detection apparatus 403 and forms an image on a light-receiving surface (a sensor unit) of the optical detection apparatus 403.

As the optical detection apparatus 403, each of the optical detection apparatuses according to the above exemplary embodiments is applied, and a distance signal indicating the distance obtained from a received light signal output from the optical detection apparatus 403 is supplied to the image processing circuit 404.

The image processing circuit 404 performs image processing for constructing a range image based on the distance signal supplied from the optical detection apparatus 403. Then, the range image (e.g., image data) obtained by the image processing is supplied to and displayed on the monitor 405 or is supplied to and stored (recorded) in the memory 406.

In the thus configured range image sensor 401, each of the above optical detection apparatuses is applied, whereby it is possible to acquire, for example, a more accurate range image according to an improvement in the characteristics of pixels.

A technique according to the present disclosure can be applied to various products. For example, the technique according to the present disclosure may be applied to an endoscopic surgical system.

Figure 22:
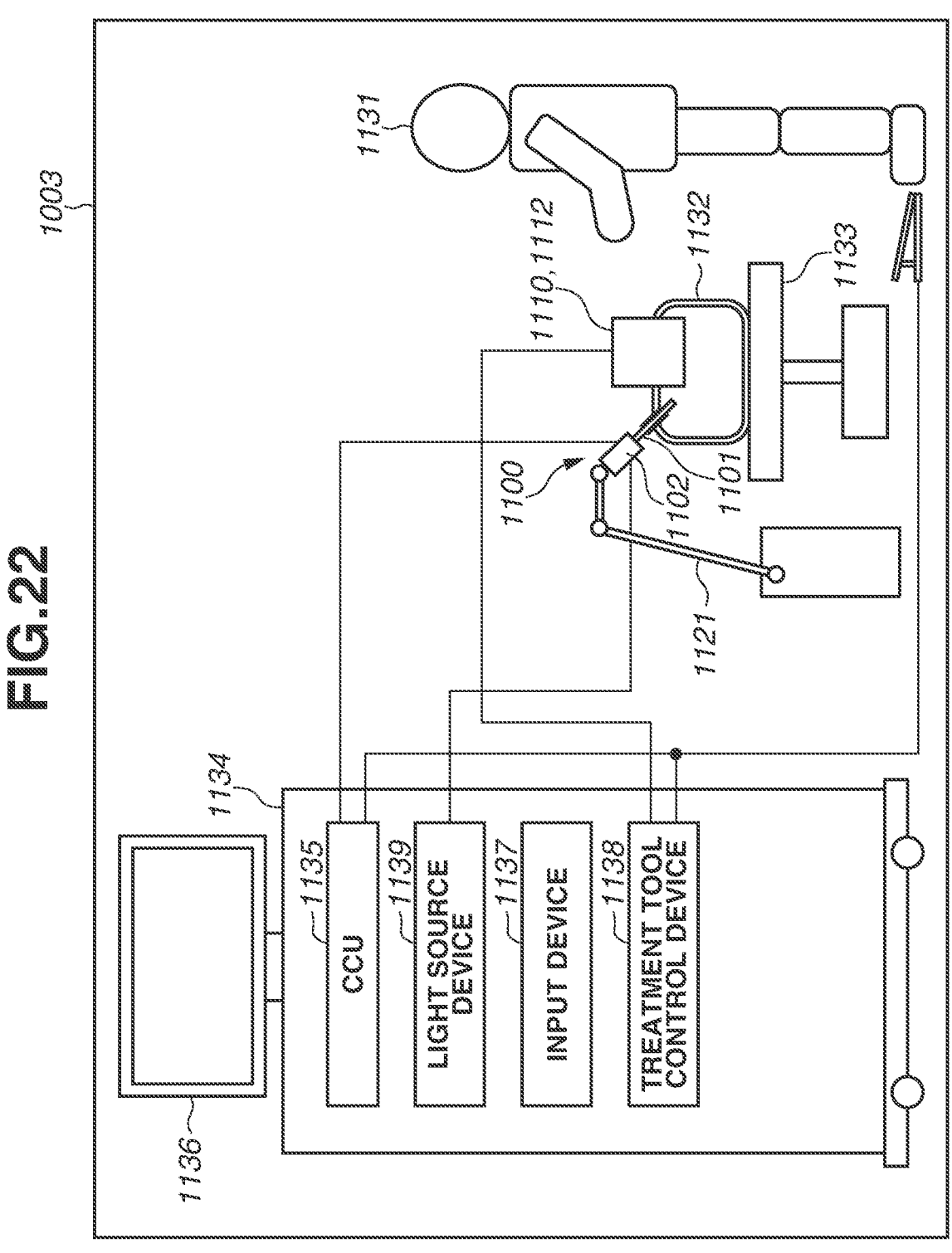
FIG. 22 is a block diagram of an optical detection system according to a tenth exemplary embodiment.

In a tenth exemplary embodiment, FIG. 22 is a diagram illustrating an example of the general configuration of an endoscopic surgical system to which the technique according to the present disclosure can be applied.

FIG. 22 illustrates the state where an operator (e.g., a doctor) 1131 performs a surgery on a patient 1132 on a patient bed 1133 using an endoscopic surgical system 1003.

As illustrated in FIG. 22, the endoscopic surgical system 1003 includes an endoscope 1100, surgical tools 1110, and a cart 1134 on which various devices for an endoscopic surgery are mounted.

The endoscope 1100 includes a lens barrel 1101 in which a region having a predetermined length from the front end of the lens barrel 1101 is inserted into a cavity of the body of the patient 1132, and a camera head 1102 connected to the base end of the lens barrel 1101. This example illustrates the endoscope 1100 configured as a so-called rigid scope including the rigid lens barrel 1101. Alternatively, the endoscope 1100 may be configured as a so-called flexible scope including a flexible lens barrel.

At the front end of the lens barrel 1101, an opening portion to which an objective lens is fitted is provided. A light source device 1139 is connected to the endoscope 1100. Light generated by the light source device 1139 is guided to the front end of the lens barrel 1101 by a light guide extending inside the lens barrel 1101, passes through the objective lens, and is emitted toward an observation target in the cavity of the body of the patient 1132. The endoscope 1100 may be a forward-viewing endoscope, or may be an oblique-viewing endoscope, or may be a side-viewing endoscope.

Inside the camera head 1102, an optical system and an optical detection apparatus are provided, and reflected light (e.g., observation light) from the observation target is collected on the optical detection apparatus by the optical system. The observation light is photoelectrically converted by the optical detection apparatus, and an electric signal corresponding to the observation light, i.e., an image signal corresponding to an observation image, is generated. As the optical detection apparatus, each of the optical detection apparatuses according to the above exemplary embodiments can be used. The image signal is transmitted as raw data to a camera control unit (CCU) 1135.

The CCU 1135 includes a central processing unit (CPU) and a graphics processing unit (GPU) and performs overall control of the operations of the endoscope 1100 and a display device 1136. Further, the CCU 1135 receives the image signal from the camera head 1102 and performs various types of image processing for displaying an image based on the image signal, such as a development process (a demosaic process), on the image signal.

Under control of the CCU 1135, the display device 1136 displays the image based on the image signal subjected to the image processing by the CCU 1135.

The light source device 1139 includes, for example, a light source such as a light-emitting diode (LED) and supplies emission light for imaging a surgical site to the endoscope 1100.

An input device 1137 is an input interface for providing an input to the endoscopic surgical system 1003. The user can input various pieces of information and input an instruction to the endoscopic surgical system 1003 through the input device 1137.

A treatment tool control device 1138 controls the driving of energy treatment tools 1112 for cauterizing or incising tissue or sealing blood vessels.

The light source device 1139 that supplies emission light for imaging a surgical site to the endoscope 1100 can be composed of, for example, an LED, a laser light source, or a white light source configured by the combination of these. In a case where a white light source is configured by the combination of red, green, and blue (RGB) laser light sources, the output intensity and the output timing of each color (each wavelength) can be controlled with high accuracy. Thus, the light source device 1139 can adjust the white balance of a captured image. In this case, laser light from each of the RGB laser light sources is emitted to the observation target in a time division manner, and the driving of an imaging element of the camera head 1102 is controlled in synchronization with the emission timing of the laser light, whereby it is also possible to capture an image corresponding to each of RGB in a time division manner Based on this method, it is possible to obtain a color image without providing color filters in the imaging element.

The driving of the light source device 1139 may be controlled to change the intensity of light output from the light source device 1139 every predetermined time. In synchronization with the timing of the change in the intensity of the light, the driving of the imaging element of the camera head 1102 is controlled to acquire images in a time division manner, and the images are combined together, whereby it is possible to generate a high dynamic range image without so-called underexposure and overexposure.

The light source device 1139 may also be configured to supply light in a predetermined wavelength band corresponding to special light observation. In the special light observation, for example, the wavelength dependence of the absorption of light in the tissue of the body is used. Specifically, light in a narrower band than emission light for normal observation (i.e., white light) is emitted, thereby imaging predetermined tissue of blood vessels in the superficial layer of a mucous membrane with high contrast. Alternatively, in the special light observation, fluorescence observation for obtaining an image with fluorescent light generated by emitting excitation light may be performed. In the fluorescence observation, excitation light can be emitted to the tissue of the body, and fluorescent light from the tissue of the body can be observed. Or a reagent such as indocyanine green (ICG) can be locally injected into the tissue of the body, excitation light corresponding to the fluorescence wavelength of the reagent can be emitted to the tissue of the body, and a fluorescent image can be obtained. The light source device 1139 can be configured to supply narrow-band light and/or excitation light corresponding to such special light observation.

Figure 23A:
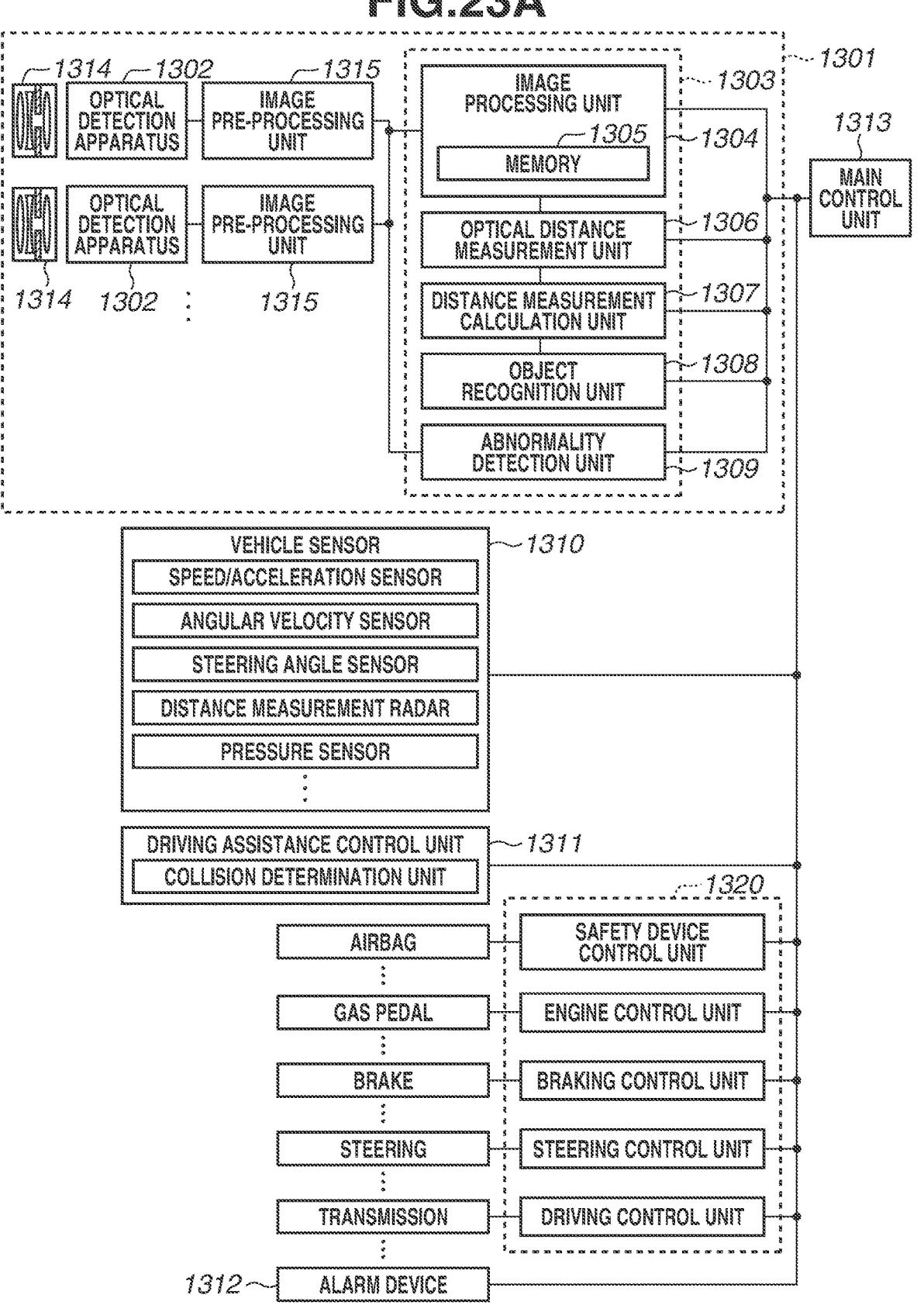
FIGS. 23A and 23B are block diagrams of an optical detection system according to an eleventh exemplary embodiment.
Figure 23B:
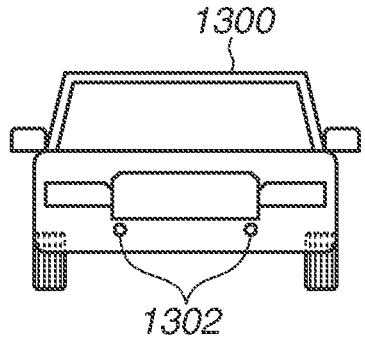
Figure 23B:
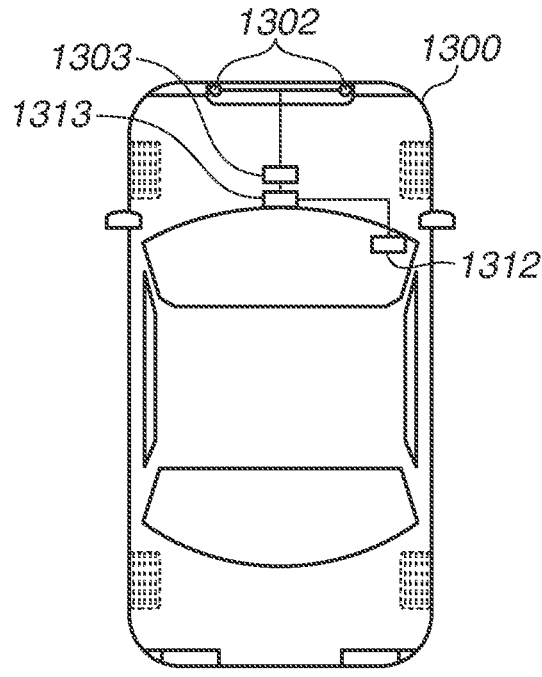
Figure 23B:
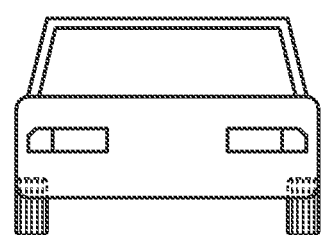
Figure 24:
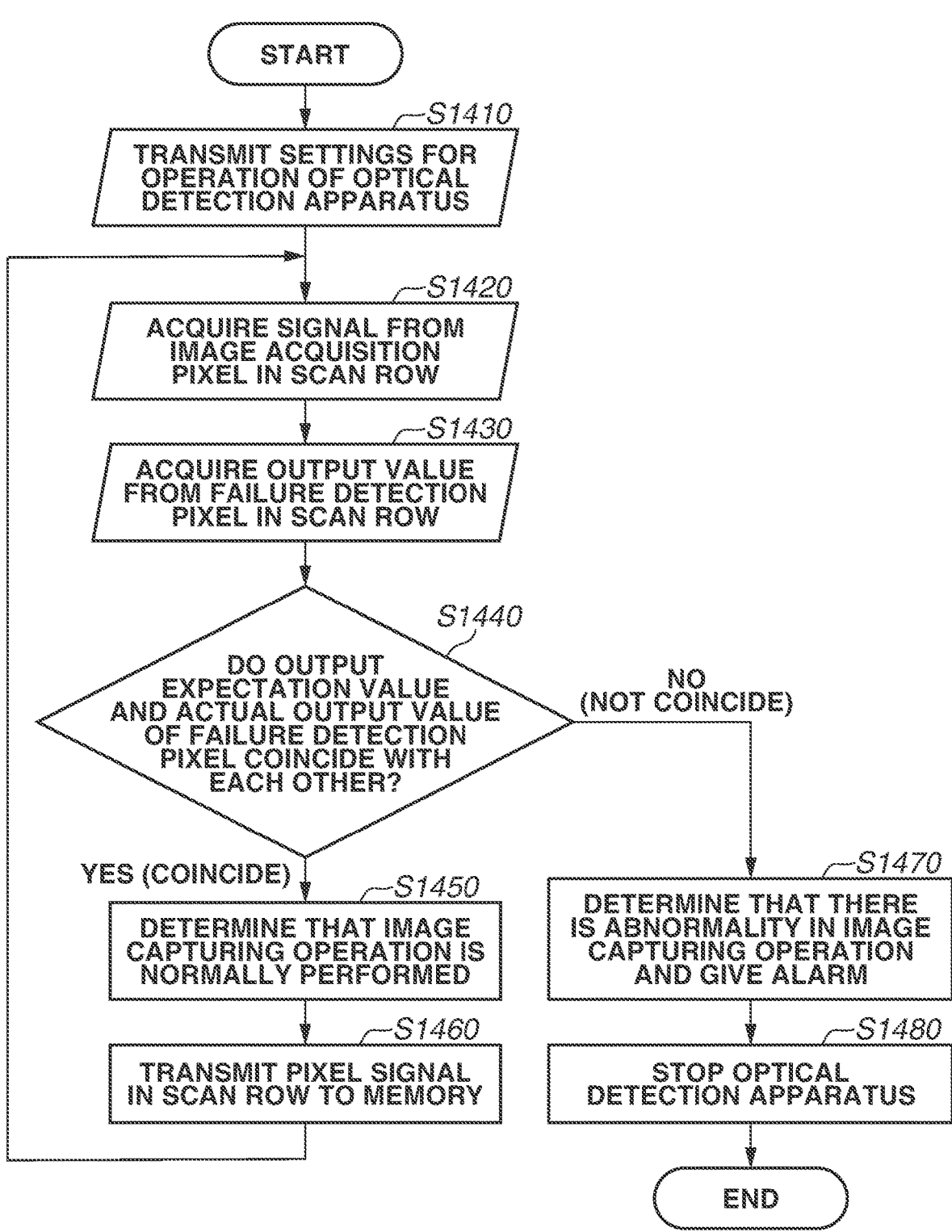
FIG. 24 is a flowchart of the optical detection system according to the eleventh exemplary embodiment.

With reference to FIGS. 23A, 23B, and 24, an optical detection system and a moving body according to an eleventh exemplary embodiment are described. FIGS. 23A and

23B are schematic diagrams illustrating examples of the configurations of the optical detection system and the moving body according to the present exemplary embodiment. FIG. 24 is a flowchart illustrating the operation of the optical detection system according to the present exemplary embodiment. In the present exemplary embodiment, an in-vehicle camera is illustrated as an example of the optical detection system.

FIGS. 23A and 23B illustrate examples of a vehicle system and an optical detection system for capturing an image that is mounted on the vehicle system. An optical detection system 1301 includes an optical detection apparatus 1302, an image pre-processing unit 1315, an integrated circuit 1303, and an optical system 1314. The optical system 1314 forms an optical image of an object on the optical detection apparatus 1302. The optical detection apparatus 1302 converts the optical image of the object formed by the optical system 1314 into an electric signal. The optical detection apparatus 1302 is the optical detection apparatus according to any of the above exemplary embodiments. The image pre-processing unit 1315 performs predetermined signal processing on the signal output from the optical detection apparatus 1302. The function of the image pre-processing unit 1315 may be built into the optical detection apparatus 1302. In the optical detection system 1301, at least two sets of the optical system 1314, the optical detection apparatus 1302, and the image pre-processing unit 1315 are provided, and outputs from the image pre-processing units 1315 in the respective sets are input to the integrated circuit 1303.

The integrated circuit 1303 is an integrated circuit for an imaging system and includes an image processing unit 1304 including a memory 1305, an optical distance measurement unit 1306, a distance measurement calculation unit 1307, an object recognition unit 1308, and an abnormality detection unit 1309. The image processing unit 1304 performs a development process and image processing such as defect correction on an output signal from each image pre-processing unit 1315. The memory 1305 primarily stores a captured image or stores the position of a defect of an imaging pixel. The optical distance measurement unit 1306 focuses on an object or measures the distance from the object. The distance measurement calculation unit 1307 calculates distance measurement information from a plurality of pieces of image data acquired by the plurality of optical detection apparatuses 1302. The object recognition unit 1308 recognizes an object such as a vehicle, a road, a sign, or a person. If detecting an abnormality in the optical detection apparatuses 1302, the abnormality detection unit 1309 informs a main control unit 1313 of the abnormality.

The integrated circuit 1303 may be achieved by hardware designed exclusively for the integrated circuit 1303, or achieved by a software module, or achieved by the combination of these. Alternatively, the integrated circuit 1303 may be achieved by a field-programmable gate array (FPGA) or an application-specific integrated circuit (ASIC), or achieved by the combination of these.

The main control unit 1313 performs overall control of the operations of the optical detection system 1301, a vehicle sensor 1310, and a control unit 1320. It is also possible to employ a method in which the main control unit 1313 is not included, and the optical detection system 1301, the vehicle sensor 1310, and the control unit 1320 individually include communication interfaces, and each transmit and receive a control signal through a communication network (e.g., the Controller Area Network (CAN) standard).

The integrated circuit 1303 has the function of transmitting a control signal or a setting value to each optical detection apparatus 1302 by receiving a control signal from the main control unit 1313 or by a control unit of the integrated circuit 1303.

The optical detection system 1301 is connected to the vehicle sensor 1310 and can detect the running states, such as the speed, the yaw rate, and the steering angle, of a vehicle in which the optical detection system 1301 is provided, the environment outside the vehicle, and the states of another vehicle and an obstacle. The vehicle sensor 1310 is also a distance information acquisition unit for acquiring distance information regarding the distance from a target object. The optical detection system 1301 is also connected to a driving assistance control unit 1311 that performs various types of driving assistance such as automatic steering, automatic cruising, and a collision prevention function. Particularly, regarding a collision determination function, based on the detection result of the optical detection system 1301 or the vehicle sensor 1310, a collision determination unit estimates collision with another vehicle or an obstacle or determines the presence or absence of collision with another vehicle or an obstacle. Consequently, in a case where collision is estimated, avoidance control is performed. Further, when collision occurs, a safety device is started.

Further, the optical detection system 1301 is also connected to an alarm device 1312 that gives an alarm to a driver based on the determination result of the collision determination unit. For example, as the determination result of the collision determination unit, if there is a high possibility of collision, the main control unit 1313 applies a brake, returns the gas pedal, or suppresses the engine output, thereby controlling the vehicle to avoid collision and reduce damage. The alarm device 1312 warns a user by setting off an alarm such as a sound, displaying alarm information on a screen of a display unit of an automotive navigation system or a meter panel, or imparting a vibration to the seat belt or the steering.

In the present exemplary embodiment, the optical detection system 1301 images the periphery, such as the front direction or the rear direction, of the vehicle. FIG. 23B illustrates an example of the placement of the optical detection system 1301 in a case where the optical detection system 1301 images the front direction of the vehicle.

The two optical detection apparatuses 1302 are disposed in a front portion of a vehicle 1300. Specifically, a center line with respect to the movement direction or the outer shape (e.g., the width) of the vehicle 1300 is regarded as a symmetrical axis, and the two optical detection apparatuses 1302 are disposed line-symmetrically with respect to the symmetrical axis. This is desirable for acquiring distance information regarding the distance between the vehicle 1300 and an image capturing target object or determining the possibility of collision. It is also desirable to place the optical detection apparatuses 1302 so as not to prevent the field of vision of the driver when the driver visually confirms the situation outside the vehicle 1300 from the driver's seat. It is desirable to place the alarm device 1312 such that the alarm device 1312 easily enters the field of vision of the driver.

Next, with reference to FIG. 24, a failure detection operation of each optical detection apparatus 1302 in the optical detection system 1301 is described. The failure detection operation of the optical detection apparatus 1302 is performed according to steps S1410 to S1480 illustrated in FIG. 24.

In step S1410, settings are made when the optical detection apparatus 1302 starts up. That is, settings for the operation of the optical detection apparatus 1302 are transmitted from outside the optical detection system 1301 (e.g., the main control unit 1313) or inside the optical detection system 1301, and an image capturing operation and a failure detection operation of the optical detection apparatus 1302 are started.

Next, in step S1420, a pixel signal is acquired from an effective pixel. Further, in step S1430, an output value from a failure detection pixel provided for failure detection is acquired. Similarly to the effective pixel, the failure detection pixel includes a photoelectric conversion unit. A predetermined voltage is written to the photoelectric conversion unit. The failure detection pixel outputs a signal corresponding to the voltage written in the photoelectric conversion unit. Steps S1420 and S1430 may be reversed.

Next, in step S1440, it is determined whether an output expectation value of the failure detection pixel and an actual output value of the failure detection pixel coincide with each other. As a result of the determination in step S1440, if the output expectation value and the actual output value coincide with each other (YES in step S1440), the processing proceeds to step S1450. In step S1450, it is determined that the image capturing operation is normally performed. Then, the processing proceeds to step S1460. In step S1460, the pixel signal in a scan row is transmitted to and primarily saved in the memory 1305. Then, the processing returns to step S1420. In step S1420, the failure detection operation is continued. On the other hand, as a result of the determination in step S1440, if the output expectation value and the actual output value do not coincide with each other (NO in step S1440), the processing proceeds to step S1470. In step S1470, it is determined that there is an abnormality in the image capturing operation. Then, an alarm is given to the main control unit 1313 or the alarm device 1312. The alarm device 1312 performs, on the display unit, display indicating that an abnormality is detected. Then, in step S1480, the optical detection apparatus 1302 is stopped, and the operation of the optical detection system 1301 is ended.

In the present exemplary embodiment, an example has been illustrated where the flowchart loops with respect to each row. Alternatively, the flowchart may loop with respect to a plurality of rows, or the failure detection operation may be performed with respect to each frame. When an alarm is given in step S1470, a portion outside the vehicle 1300 may be notified of the information via a wireless network.

In the present exemplary embodiment, a description has been given of control for preventing a vehicle from colliding with another vehicle. Alternatively, the present exemplary embodiment is also applicable to control for automatically driving a vehicle by following another vehicle, or control for automatically driving a vehicle so as to stay in a lane. Further, the optical detection system 1301 can be applied not only to a vehicle such as a vehicle in which the optical detection system 1301 is provided, but also to a moving body (a moving apparatus) such as a vessel, an aircraft, or an industrial robot. Additionally, the optical detection system 1301 can be applied not only to a moving body but also to a device widely using object recognition, such as an intelligent transportation system (ITS).

A configuration may be employed in which the optical detection apparatus according to the present disclosure can further acquire various pieces of information such as distance information.

OTHER EXEMPLARY EMBODIMENTS

While the exemplary embodiments have been described above, the present disclosure is not limited to these exemplary embodiments, and can be changed and modified in various manners. The exemplary embodiments are applicable to each other.

According to the present disclosure, it is possible to provide an optical detection apparatus capable of improving the temporal resolution of optical detection.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-126315, filed Jul. 27, 2020, which is hereby incorporated by reference herein in its entirety.

What is claimed is:

1. An optical detection apparatus comprising:
a pixel array unit in which a plurality of photoelectric conversion elements is disposed in a two-dimensional array in a planar view in a substrate; and
a trench isolation portion provided in the substrate and disposed between the plurality of ]photoelectric conversion elements,
wherein each of the plurality of photoelectric conversion elements includes an avalanche diode,
wherein the avalanche diode includes a first semiconductor region of a first conductivity type which is disposed at a first depth level from a first surface of the substrate and where charges of a same conductivity type as a signal charge are majority carriers, a second semiconductor region of a second conductivity type disposed at a second depth level from the first surface where a distance from the first surface is longer than the first depth and a distance from a second surface opposed to the first surface is shorter than the distance from the first surface, and a third semiconductor region disposed at a third depth level from the first surface where a distance from the first surface is longer than the first depth and the distance from the first surface is shorter than the second depth and having an impurity concentration lower than impurity concentrations of the first and second semiconductor regions,
wherein the trench isolation portion includes a conductor and an insulator disposed between the conductor and the avalanche diode, and
wherein, when a predetermined potential is supplied to the conductor, a second conductivity type layer, which is an inversion layer and in which charges of the second conductivity type included in the third semiconductor region are accumulated, is formed on a side wall of the trench isolation portion at the third depth level, and the second conductivity type layer and the second semiconductor region are in contact with each other.

2. The optical detection apparatus according to claim 1, wherein the trench isolation portion is disposed in contact with the second semiconductor region.

3. The optical detection apparatus according to claim 1, wherein the avalanche diode includes a fourth semiconductor region of the second conductivity type disposed at a fourth depth level from the first surface where a distance from the first surface is longer than the first depth and the distance from the first surface is shorter than the third depth, and
wherein an avalanche multiplication region is formed by the first and fourth semiconductor regions.

4. The optical detection apparatus according to claim 3, wherein the fourth semiconductor region is disposed in contact with the trench isolation portion.

5. The optical detection apparatus according to claim 3, wherein the second conductivity type layer is in contact with the fourth semiconductor region.

6. The optical detection apparatus according to claim 1, wherein the second surface has a scattering structure.

7. The optical detection apparatus according to claim 1, wherein the second surface has a pyramid shape.

8. The optical detection apparatus according to claim 7, wherein a depth of a recessed portion forming a pyramid of the pyramid shape is $1/30$ or more and $1/3$ or less of a width of each of the photoelectric conversion elements in a cross section view.

9. The optical detection apparatus according to claim 1, wherein each of the photoelectric conversion elements photoelectrically converts infrared light.

10. The optical detection apparatus according to claim 1, wherein an aperture ratio of each of the photoelectric conversion elements is 50% or more and 100% or less.

11. The optical detection apparatus according to claim 1, wherein on the sidewall of the trench isolation portion, a concentration of a portion where an impurity concentration of the second conductivity type is lowest is $5 \times 10^{17}$ cm-3 or less.

12. The optical detection apparatus according to claim 1, wherein the first conductivity type is N-type and the second conductivity type is P-type.

13. The optical detection apparatus according to claim 1, wherein the avalanche diode includes a fifth semiconductor region of the second conductivity type disposed at the first depth level from the first surface, and
wherein the second conductivity type layer and the fifth semiconductor region are in contact with each other.

14. The optical detection apparatus according to claim 1, wherein the second conductivity type layer and the second semiconductor region are directly in contact with each other.

15. The optical detection apparatus according to claim 1, further comprising:
a first contact plug connected to the avalanche diode and supplying a first voltage;
a second contact plug connected to the avalanche diode and supplying a second voltage; and
a third contact plug connected to the conductor and supplying a third voltage,
wherein the second voltage is lower than the first voltage and the third voltage is lower than the second voltage.

16. The optical detection apparatus according to claim 15, wherein the second voltage is supplied to the second semiconductor region via the second conductivity type layer formed when the third voltage is supplied to the conductor via the third contact plug.

17. An optical detection system comprising:
an optical detection apparatus including:
a pixel array unit in which a plurality of photoelectric conversion elements are disposed in a two-dimensional array in a planar view in a substrate; and
a trench isolation portion provided in the substrate and disposed between the plurality of ]photoelectric conversion elements,
wherein each of the plurality of photoelectric conversion elements includes an avalanche diode,
wherein the avalanche diode includes a first semiconductor region of a first conductivity type which is disposed at a first depth level from a first surface of the substrate and where charges of a same conductivity type as a signal charge are majority carriers, a second semiconductor region of a second conductivity type disposed at a second depth level from the first surface where a distance from the first surface is longer than the first depth and a distance from a second surface opposed to the first surface is shorter than the distance from the first surface, and a third semiconductor region disposed at a third depth level from the first surface where a distance from the first surface is longer than the first depth and the distance from the first surface is shorter than the second depth and having an impurity concentration lower than impurity concentrations of the first and second semiconductor regions, wherein the trench isolation portion includes a conductor and an insulator disposed between the conductor and the avalanche diode, and wherein, when a predetermined potential is supplied to the conductor, a second conductivity type layer, which is an inversion layer and in which charges of the second conductivity type included in the third semiconductor region are accumulated, is formed on a side wall of the trench isolation portion at the third depth level, and the second conductivity type layer and the second semiconductor region are in contact with each other; and a signal processing unit configured to process a signal output from the optical detection apparatus.

18. A moving body comprising:

an optical detection apparatus including:

a pixel array unit in which a plurality of photoelectric conversion elements are disposed in a two-dimensional array in a planar view in a substrate; and a trench isolation portion provided in the substrate and disposed between the plurality of ]photoelectric conversion elements, wherein each of the plurality of photoelectric conversion elements includes an avalanche diode, wherein the avalanche diode includes a first semiconductor region of a first conductivity type which is disposed at a first depth level from a first surface of the substrate and where charges of a same conductivity type as a signal charge are majority carriers, a second semiconductor region of a second conductivity type disposed at a second depth level from the first surface where a distance from the first surface is longer than the first depth and a distance from a second surface opposed to the first surface is shorter than the distance from the first surface, and a third semiconductor region disposed at a third depth level from the first surface where a distance from the first surface is longer than the first depth and the distance from the first surface is shorter than the second depth and having an impurity concentration lower than impurity concentrations of the first and second semiconductor regions, wherein the trench isolation portion includes a conductor and an insulator disposed between the conductor and the avalanche diode, and wherein, when a predetermined potential is supplied to the conductor, a second conductivity type layer, which is an inversion layer and in which charges of the second conductivity type included in the third semiconductor region are accumulated, is formed on a side wall of the trench isolation portion at the third depth level, and the second conductivity type layer and the second semiconductor region are in contact with each other;

a distance information acquisition unit configured to acquire distance information regarding a distance from a target object from distance measurement information based on a signal from the optical detection apparatus; and a control unit configured to control the moving body based on the distance information.

* * * * *